(12) United States Patent
Nakada

(10) Patent No.: US 11,210,767 B2
(45) Date of Patent: Dec. 28, 2021

(54) INFORMATION PROCESSING APPARATUS TO DETERMINE CANDIDATE FOR LIGHTING EFFECT, INFORMATION PROCESSING METHOD, AND STORAGE MEDIUM

(71) Applicant: CANON KABUSHIKI KAISHA, Tokyo (JP)

(72) Inventor: Yuichi Nakada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/775,793

(22) Filed: Jan. 29, 2020

(65) Prior Publication Data

US 2020/0250799 A1    Aug. 6, 2020

(30) Foreign Application Priority Data

Feb. 6, 2019 (JP) .............................. JP2019-020147
Oct. 7, 2019 (JP) .............................. JP2019-184741

(51) Int. Cl.
*G06T 5/00* (2006.01)
*G06T 7/90* (2017.01)

(52) U.S. Cl.
CPC .............. *G06T 5/007* (2013.01); *G06T 7/90* (2017.01); *G06T 2207/10024* (2013.01)

(58) Field of Classification Search
CPC ....... G06T 15/506; G06T 15/50; G06T 15/60; G06T 15/80; G06T 15/06
See application file for complete search history.

(56) References Cited

U.S. PATENT DOCUMENTS

| 10,816,939 | B1* | 10/2020 | Coleman ................. G01S 7/00 |
| 2003/0202120 | A1* | 10/2003 | Mack .................... H04N 5/2224 348/578 |
| 2014/0184889 | A1* | 7/2014 | Wada ............... H04N 5/232122 348/353 |
| 2016/0330434 | A1* | 11/2016 | Chen .................... H04N 13/271 |
| 2017/0019651 | A1* | 1/2017 | Kitajima ................. H04N 9/07 |
| 2018/0007291 | A1 | 1/2018 | Ida |
| 2018/0349008 | A1* | 12/2018 | Manzari ............ H04N 5/23219 |

FOREIGN PATENT DOCUMENTS

| CN | 101529474 A | 9/2009 |
| CN | 104954697 A | 9/2015 |
| CN | 110288692 A | 9/2019 |
| JP | 2017-117029 A | 6/2017 |
| JP | 2018010496 A | 1/2018 |

* cited by examiner

*Primary Examiner* — Todd Buttram
(74) *Attorney, Agent, or Firm* — Canon U.S.A., Inc. IP Division

(57) ABSTRACT

An information processing apparatus includes a processor and a memory. The memory contains instructions that, when executed by the processor, cause the processor to perform as a first obtaining unit, a second obtaining unit, and a first determination unit. The first obtaining unit is configured to obtain image data representing an image. The second obtaining unit is configured to obtain distance information corresponding to the image data. The first determination unit is configured to determine, based on accuracy of the distance information, a candidate for a lighting effect applicable to the image in applying a lighting effect based on the distance information to the image.

15 Claims, 29 Drawing Sheets

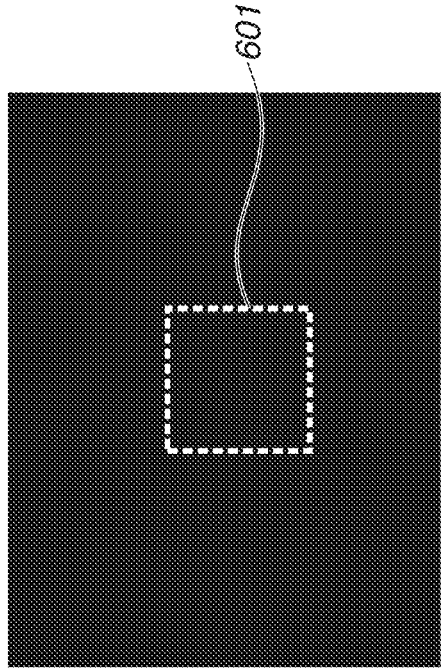
FIG.6A
COLOR IMAGE
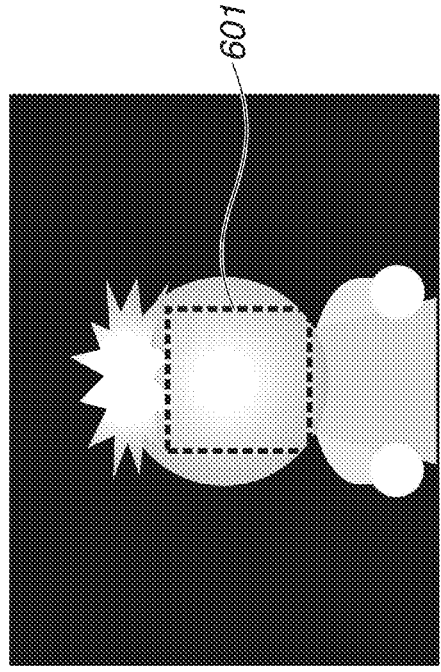
FIG.6B
EXAMPLE OF DISTANCE IMAGE WHERE DISTANCE ACCURACY IS DETERMINED TO BE "LOW"
FIG.6C
EXAMPLE OF DISTANCE IMAGE WHERE DISTANCE ACCURACY IS DETERMINED TO BE "INTERMEDIATE"
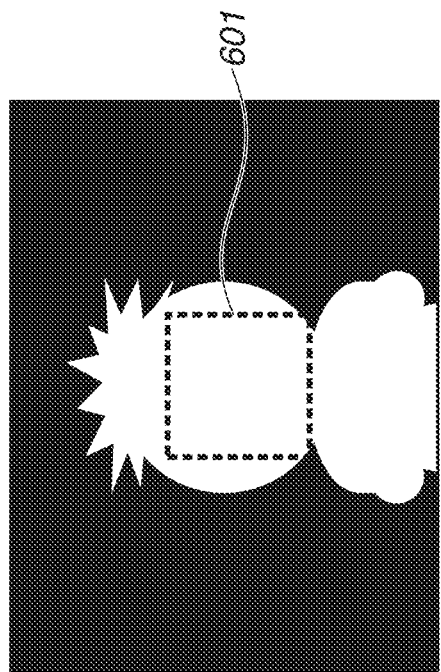
FIG.6D
EXAMPLE OF DISTANCE IMAGE WHERE DISTANCE ACCURACY IS DETERMINED TO BE "HIGH"

FIG.7

| DISTANCE ACCURACY | LIGHTING EFFECTS | | | |
| --- | --- | --- | --- | --- |
| | OFF | EMPHASIS ON FACE | EMPHASIS ON OBJECT | SPECIFY LIGHT SOURCE POSITION |
| LOW | ✓ | ✓ | × | × |
| INTERMEDIATE | ✓ | ✓ | ✓ | × |
| HIGH | ✓ | ✓ | ✓ | ✓ |

OFF  EMPHASIS ON FACE  EMPHASIS ON OBJECT  SPECIFY LIGHT SOURCE POSITION

DISPLAY IMAGE CORRESPONDING TO DISTANCE ACCURACY "LOW"

DISPLAY IMAGE CORRESPONDING TO DISTANCE ACCURACY "INTERMEDIATE"

DISPLAY IMAGE CORRESPONDING TO DISTANCE ACCURACY "HIGH"

DISPLAY IMAGE WHEN
"EMPHASIS ON FACE" IS SELECTED

DISPLAY IMAGE WHEN
"EMPHASIS ON OBJECT" IS SELECTED

DISPLAY IMAGE WHEN "SPECIFY LIGHT
SOURCE POSITION" IS SELECTED

FIG.16

| PERSONAL NAME | A | B | ... |
|---|---|---|---|
| PERSONAL IMAGE DATA | | | ... |
| PERSONAL DISTANCE IMAGE DATA | | | ... |
| PERSONAL DISTANCE ACCURACY | HIGH | INTERMEDIATE | ... |

DISPLAY IMAGE WHEN MAIN CAMERA IS SELECTED
(DISTANCE ACCURACY: INTERMEDIATE)

DISPLAY IMAGE WHEN FRONT CAMERA
IS SELECTED (DISTANCE ACCURACY: LOW)

FIG.23A

| DISTANCE ACCURACY | LIGHTING PARAMETERS | | |
|---|---|---|---|
| | ON/OFF | BRIGHTNESS | POSITION |
| LOW | ✓ | ✗ | ✗ |
| INTERMEDIATE | ✓ | ✓ | ✗ |
| HIGH | ✓ | ✓ | ✓ |

FIG.23B

| DISTANCE ACCURACY | LIGHTING PARAMETERS | | |
|---|---|---|---|
| | ON/OFF | BRIGHTNESS | POSITION |
| LOW | ✓ | ✗ | ✗ |
| INTERMEDIATE | ✓ | ✓ | ✓ (RANGE OF MOVEMENT: NARROW) |
| HIGH | ✓ | ✓ | ✓ |

DISPLAY IMAGE CORRESPONDING TO DISTANCE ACCURACY "INTERMEDIATE"

DISPLAY IMAGE CORRESPONDING TO DISTANCE ACCURACY "LOW"

DISPLAY IMAGE CORRESPONDING TO DISTANCE ACCURACY "HIGH"

DISPLAY IMAGE WHEN MAIN CAMERA IS SELECTED
(DISTANCE ACCURACY: INTERMEDIATE)

DISPLAY IMAGE WHEN FRONT CAMERA
IS SELECTED (DISTANCE ACCURACY: LOW)

DISPLAY IMAGE WHEN SINGLE-LENS
IMAGING MODE IS SELECTED
(DISTANCE ACCURACY: INTERMEDIATE)

DISPLAY IMAGE WHEN MULTI-LENS
IMAGING MODE IS SELECTED
(DISTANCE ACCURACY: HIGH)

INFORMATION PROCESSING APPARATUS TO DETERMINE CANDIDATE FOR LIGHTING EFFECT, INFORMATION PROCESSING METHOD, AND STORAGE MEDIUM

BACKGROUND

Field

One disclosed aspect of the embodiments relates to an information processing technique for applying an effect based on a virtual light source to an image.

Description of the Related Art

Image processing techniques for applying an effect as if an object in an image is illuminated with light from a virtual light source (hereinafter, referred to as a lighting effect) have heretofore been known. Japanese Patent Application Laid-Open No. 2017-117029 discusses a technique for applying a lighting effect to an image based on three-dimensional information about an object.

According to Japanese Patent Application Laid-Open No. 2017-117029, a desired lighting effect can sometimes be not applicable to the image depending on accuracy of distance information about the object, however.

SUMMARY

An aspect of the embodiments is directed to providing information processing for determining appropriate candidates for a lighting effect to apply a lighting effect to an image based on distance information about an object.

According to an aspect of the embodiments, an information processing apparatus includes a first obtaining unit configured to obtain image data representing an image, a second obtaining unit configured to obtain distance information corresponding to the image data, and a first determination unit configured to determine, based on accuracy of the distance information, a candidate for a lighting effect applicable to the image in applying a lighting effect based on the distance information to the image.

Further features of the disclosure will become apparent from the following description of exemplary embodiments with reference to the attached drawings.

BRIEF DESCRIPTION OF THE DRAWINGS

FIGS. 6A, 6B, 6C, and 6D are diagrams illustrating the outline of processing for determining accuracy of distance information.

FIG. 7 is a diagram illustrating examples of lighting effects to be included in the lighting effect list.

FIG. 16 is a diagram illustrating examples of personal information.

FIGS. 23A and 23B are diagrams illustrating setting examples of the adjustable range of lighting parameters.

DESCRIPTION OF THE EMBODIMENTS

Exemplary embodiments will be described below with reference to the drawings. The following exemplary embodiments do not necessarily limit the disclosure. All combinations of features described in the exemplary embodiments are not necessarily essential to the solving means of the disclosure.

<Application of Lighting Effect to Image Based on Distance Information>

A first exemplary embodiment of the disclosure will be described below. In applying a lighting effect to an image based on distance information about an object, distance information having sufficient accuracy to identify a front-to-back relationship between the object and a background is necessary if a lighting effect of illuminating closer objects more brightly is intended to be applied. To apply a lighting effect through which an object is shown as if light from a light source is incident at an angle, distance information having sufficient accuracy to identify facial features of the object is necessary. In such a manner, distance information is demanded to have certain accuracy depending on the lighting effect. If the distance information does not have sufficient accuracy to apply a desired lighting effect, the desired lighting effect can be unobtainable. For such a reason, in the present exemplary embodiment, candidates for a lighting effect appropriate to be applied to an image are presented to a user based on the accuracy of the distance information used in applying a lighting effect to the image. This enables the user to select a lighting effect appropriate for the distance information obtained in association with the image. In the present exemplary embodiment, lighting effects unintended by the user can thus be prevented from being applied to the image because of a mismatch between lighting effects applicable based on the accuracy of the distance information and the lighting effect intended by the user.

<Hardware Configuration of Information Processing Apparatus 1>

Figure 1A:
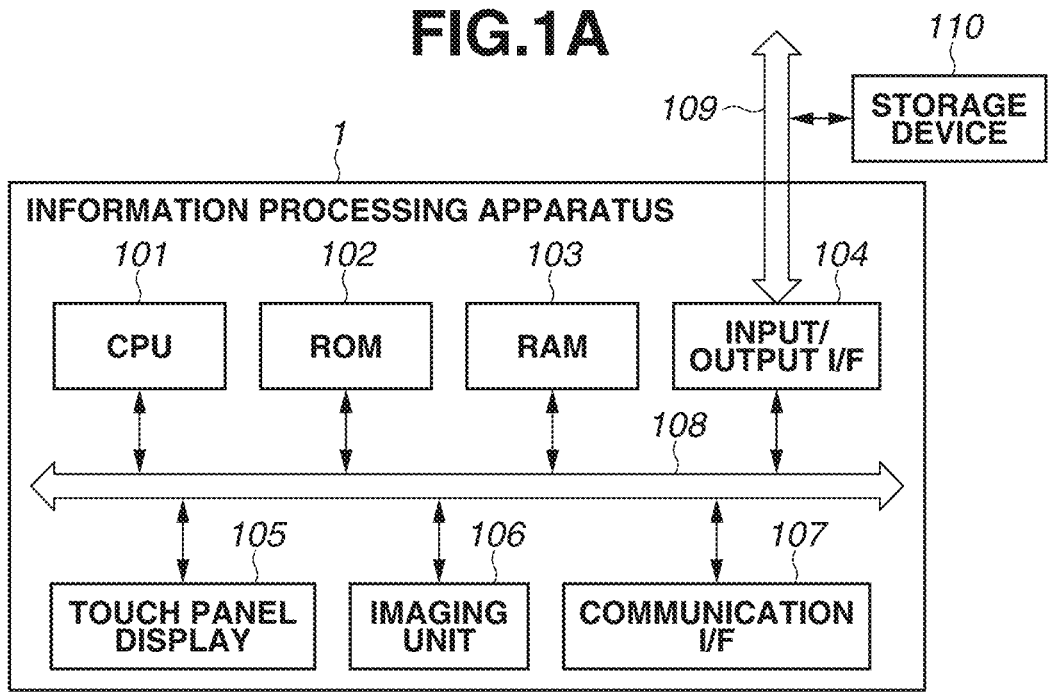
FIGS. 1A and 1B are diagrams illustrating hardware configurations of information processing apparatuses.

FIG. 1A is a diagram illustrating an example of a hardware configuration of an information processing apparatus 1. The information processing apparatus 1 is implemented by a device having a communication function and an imaging function, such as a smartphone and a tablet personal computer (PC). The information processing apparatus 1 includes a central processing unit (CPU) 101, a read-only memory (ROM) 102, a random access memory (RAM) 103, an input/output interface (I/F) 104, a touch panel display 105, an imaging unit 106, and a communication I/F 107. The CPU 101 executes an operating system (OS) and various programs stored in the ROM 102 and a storage device 110 by using the RAM 103 as a work memory. The CPU 101 controls the components via a system bus 108. Processing based on flowcharts (described below) is implemented by the CPU 101 loading program code stored in the ROM 102 and the storage device 110 into the RAM 103 and executing the program code. The storage device 110 is connected to the input/output I/F 104 via a serial bus 109. The storage device 110 is a hard disk drive (HDD), an optical drive, a flash storage device, or any other non-volatile memory, mass or secondary storage devices. The touch panel display 105 is an input/output unit integrally including a display that displays an image and a touch panel that detects the position of a touch made with an indication member, such as a finger. The imaging unit 106 obtains an image of an imaging target.

Figure 2A:
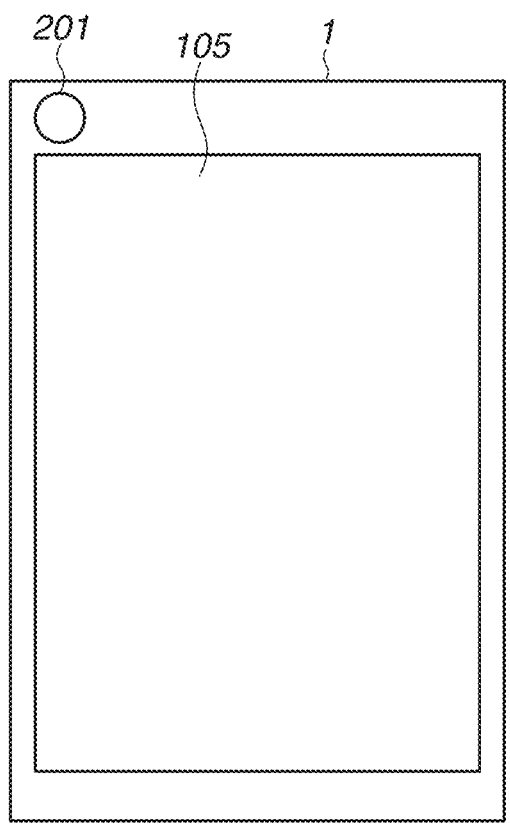
FIGS. 2A and 2B are diagrams illustrating an appearance of an information processing apparatus.
Figure 2B:
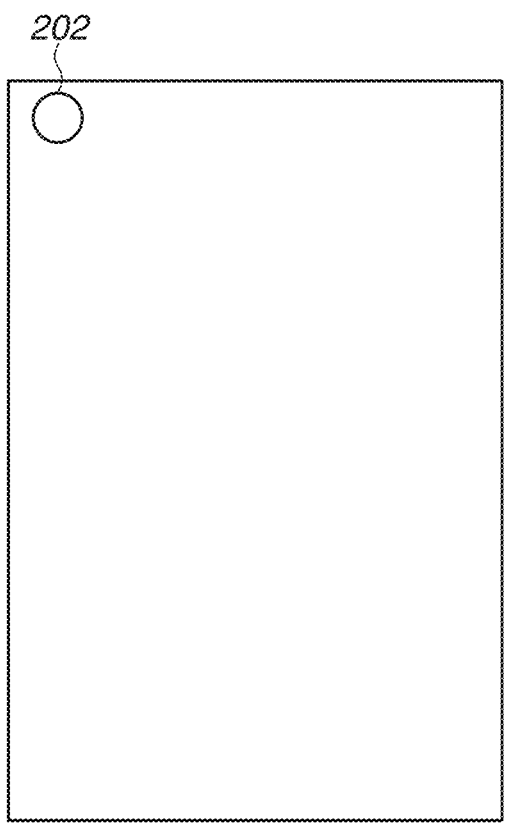

FIGS. 2A and 2B illustrate an example of the appearance of the information processing apparatus 1 according to the present exemplary embodiment. FIG. 2A illustrates a side of the information processing apparatus 1 where the touch panel display 105 is located (hereinafter, referred to as a display side). FIG. 2B illustrates the opposite side (hereinafter, referred to as a rear side) of the information processing apparatus 1 from the display side. The imaging unit 106 according to the present exemplary embodiment includes a main camera 202 on the rear side of the information processing apparatus 1 and a front camera 201 on the display side of the information processing apparatus 1. The front camera 201 is located and directed so that the front camera 201 can capture an image of the face of the user viewing the display (display screen). The communication I/F 107 performs wired or wireless two-way communication with another information processing apparatus, a communication device, or a storage device. The communication I/F 107 according to the present exemplary embodiment can transmit and receive data to/from a communication partner via a wireless local area network (LAN). Aside from direct communication, the communication I/F 107 can also perform indirect communication with another communication device via a relay apparatus.

<Logical Configuration of Information Processing Apparatus 1>

Figure 3:
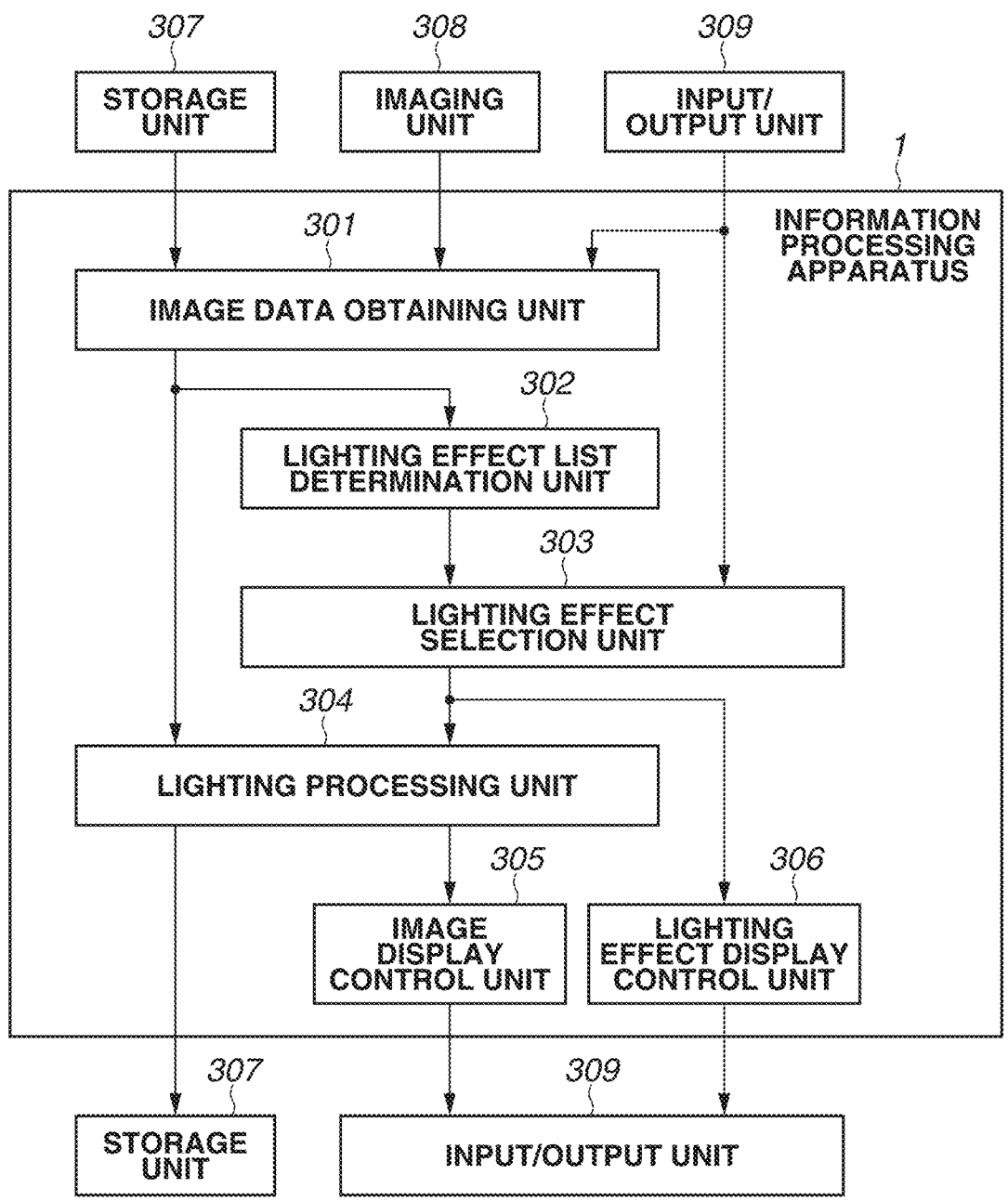
FIG. 3 is a diagram illustrating a logical configuration of the information processing apparatus.

A logical configuration example of the information processing apparatus 1 will be described. FIG. 3 is a block diagram illustrating a logical configuration of the information processing apparatus 1 according to the present exemplary embodiment. The information processing apparatus 1 functions as the logical configuration illustrated in FIG. 3 by the CPU 101 executing programs stored in the ROM 102 with the RAM 103 as a work memory. All the processing described below does not necessarily need to be performed by the CPU 101. The information processing apparatus 1 may be configured so that part or all of the processing is performed by one or a plurality of processing circuits other than the CPU 101.

The information processing apparatus 1 includes an image data obtaining unit 301, a lighting effect list determination unit 302, a lighting effect selection unit 303, a lighting processing unit 304, an image display control unit 305, and a lighting effect display control unit 306. The image data obtaining unit 301 obtains image data from an imaging unit 308 or a storage unit 307 based on the user's instructions obtained from the input/output unit 309. The image data obtaining unit 301 obtains two types of image data, namely, color image data representing a color image to which a lighting effect is to be applied and distance image data including distance information corresponding to the color image. The functions of the storage unit 307 are implemented by, for example, the storage device 110. The functions of the imaging unit 308 are implemented by the imaging unit 106. The functions of the input/output unit 309 are implemented by the touch panel display 105.

Color image data represents a color image having a red (R) value, a green (G) value, and a blue (B) value for each pixel. Color image data is generated by capturing an image of an object, using the imaging unit 308. Distance image data represents a distance image having a distance value from the imaging unit 308 to the object to be imaged for each pixel. Distance image data is generated based on a plurality of pieces of color image data obtained by capturing images of an object from a plurality of different positions. For example, distance image data can be generated by using typical stereo matching based on image data obtained by capturing images of an object using two cameras arranged next to each other, or image data obtained by capturing an image of an object a plurality of times while moving the position of a camera. Distance image data may be generated by using a distance acquisition apparatus including an infrared emission unit that irradiates an object with infrared light and a light reception unit that receives the infrared light reflected from the object. Specifically, a distance value from a camera to an object can be calculated based on a time for the infrared light emitted from the infrared emission unit to be reflected from the object and received by the light reception unit. The method for generating distance information such as distance image data is not limited to the foregoing. For example, distance information about an object may be generated by fitting three-dimensional model data corresponding to the object to the object based on color image data. The images represented by the respective pieces of image data obtained by the image data obtaining unit 301 shall be such that their pixel values at the same pixel positions correspond to the same position on the object.

The lighting effect list determination unit 302 determines accuracy of the distance information included in the distance image data (hereinafter, referred to as distance accuracy), and determines a list (hereinafter, referred to as a lighting effect list) including effective lighting effects based on the distance accuracy. In the present exemplary embodiment, the lighting effect list determination unit 302 has four different lighting effects as applicable lighting effects in advance. However, some of the lighting effects can fail to be implemented depending on the accuracy of the distance information. The lighting effect list determination unit 302 thus selects lighting effects that are effective for the image to be processed from among the applicable lighting effects in advance based on the distance accuracy. Here, the lighting effect list determination unit 302 generates a lighting effect list by selecting at least two and up to four lighting effects. The lighting effect selection unit 303 selects one of the lighting effects included in the lighting effect list based on user operations obtained from the input/output unit 309. To apply the selected lighting effect to the color image, the lighting processing unit 304 corrects the color image by performing lighting processing on the color image. The lighting processing unit 304 records image data representing the image to which the lighting effect has been applied into the storage unit 307 based on user operations obtained from the input/output unit 309.

The image display control unit 305 displays the image to which the lighting effect has been applied on the input/output unit 309, using the input/output unit 309 as a display unit. The lighting effect display control unit 306 displays icons corresponding to the lighting effects included in the lighting effect list on the input/output unit 309.

<Processing Performed by Information Processing Apparatus 1>

Figure 4:
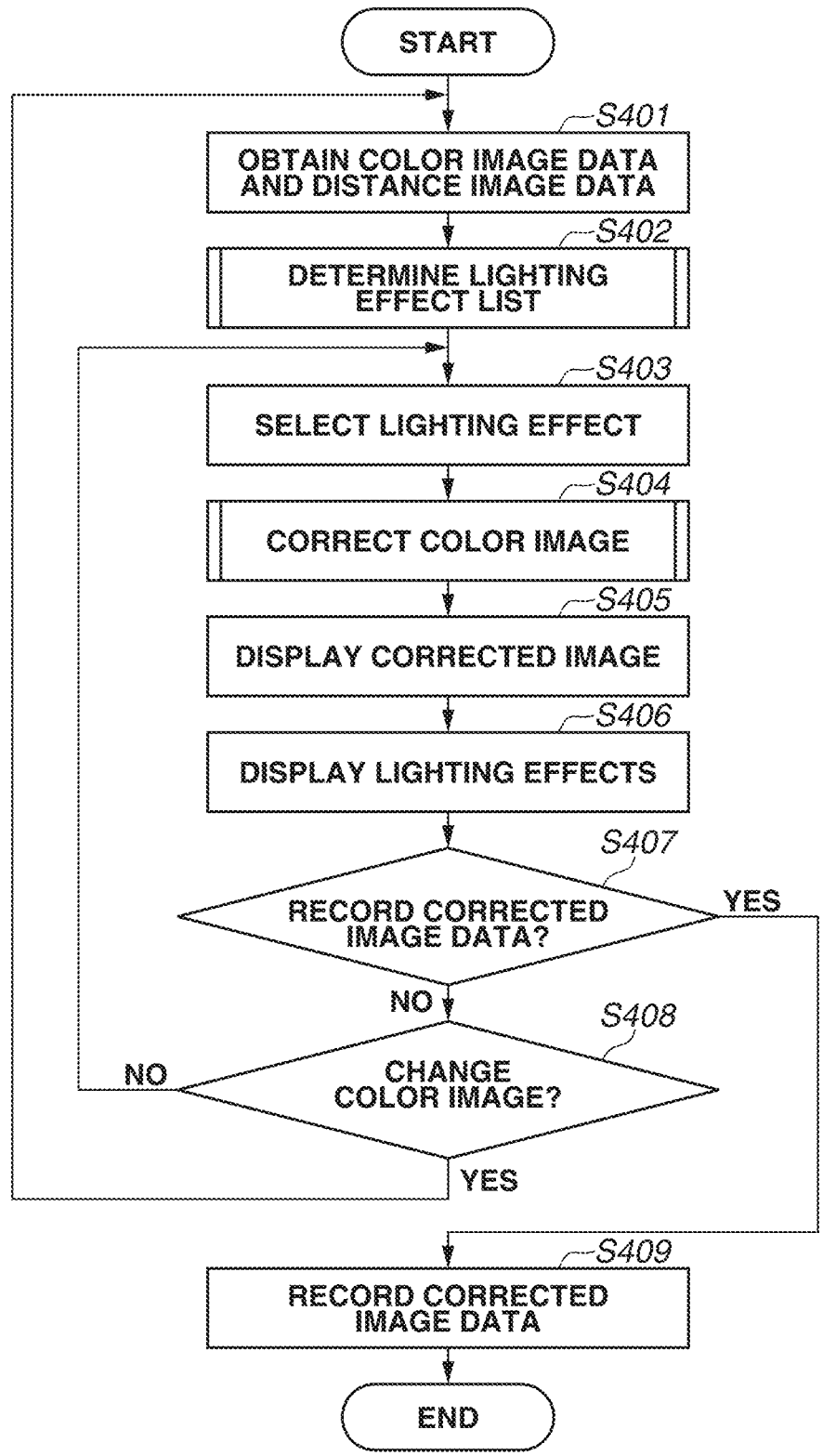
FIG. 4 is a flowchart illustrating processing which is performed by the information processing apparatus.

FIG. 4 is a flowchart illustrating processing which is performed by the information processing apparatus 1. In the present exemplary embodiment, lighting effects applicable to a color image are presented based on distance accuracy that is set based on distance image data. Hereinafter, steps will be denoted by numerals with a leading "S".

In step S401, the image data obtaining unit 301 obtains color image data and distance image data from the storage unit 307 based on user operations obtained from the input/output unit 309. The storage unit 307 here contains color image data and distance image data generated in advance through the foregoing method. In step S402, the lighting effect list determination unit 302 determines a lighting effect list including effective lighting effects based on distance accuracy that is set based on the distance image data. Details of the processing for determining the lighting effect list will be described below.

In step S403, the lighting effect selection unit 303 selects one of the lighting effects included in the lighting effect list based on user operations obtained from the input/output unit 309. The lighting effect selection unit 303 also sets lighting parameters, including the direction of a virtual light source for illuminating an object with light, based on user operations. If no lighting effect is selected by the user operations, the lighting effect selection unit 303 selects a lighting effect previously determined as an initial state. In step S404, the lighting processing unit 304 corrects the color image based on the selected lighting effect. The corrected color image will hereinafter be referred to as a corrected image. Image data representing the corrected image will be referred to as corrected image data. Details of the processing for correcting the color image will be described below.

In step S405, the image display control unit 305 displays the corrected image on the input/output unit 309. In step S406, the lighting effect display control unit 306 displays the lighting effects included in the lighting effect list on the input/output unit 309. The display of the lighting effects will be described in detail below. In step S407, the lighting processing unit 304 determines whether to record the corrected image data in the storage unit 307 based on user operations obtained from the input/output unit 309. If an operation to record the corrected image data is detected (YES in step S407), the processing proceeds to step S409. If no operation to record the corrected image data is detected (NO in step S407), the processing proceeds to step S408. In step S408, the lighting processing unit 304 determines whether to change the color image to apply a lighting effect to based on user operations obtained from the input/output unit 309. If an operation to change the color image is detected (YES in step S408), the processing proceeds to step S401. If no operation to change the color image is detected (NO in step S408), the processing proceeds to step S403. In step S409, the lighting processing unit 304 records the corrected image data in the storage unit 307. The processing ends.

<Processing for Determining Lighting Effect List (Step S402)>

Figure 5:
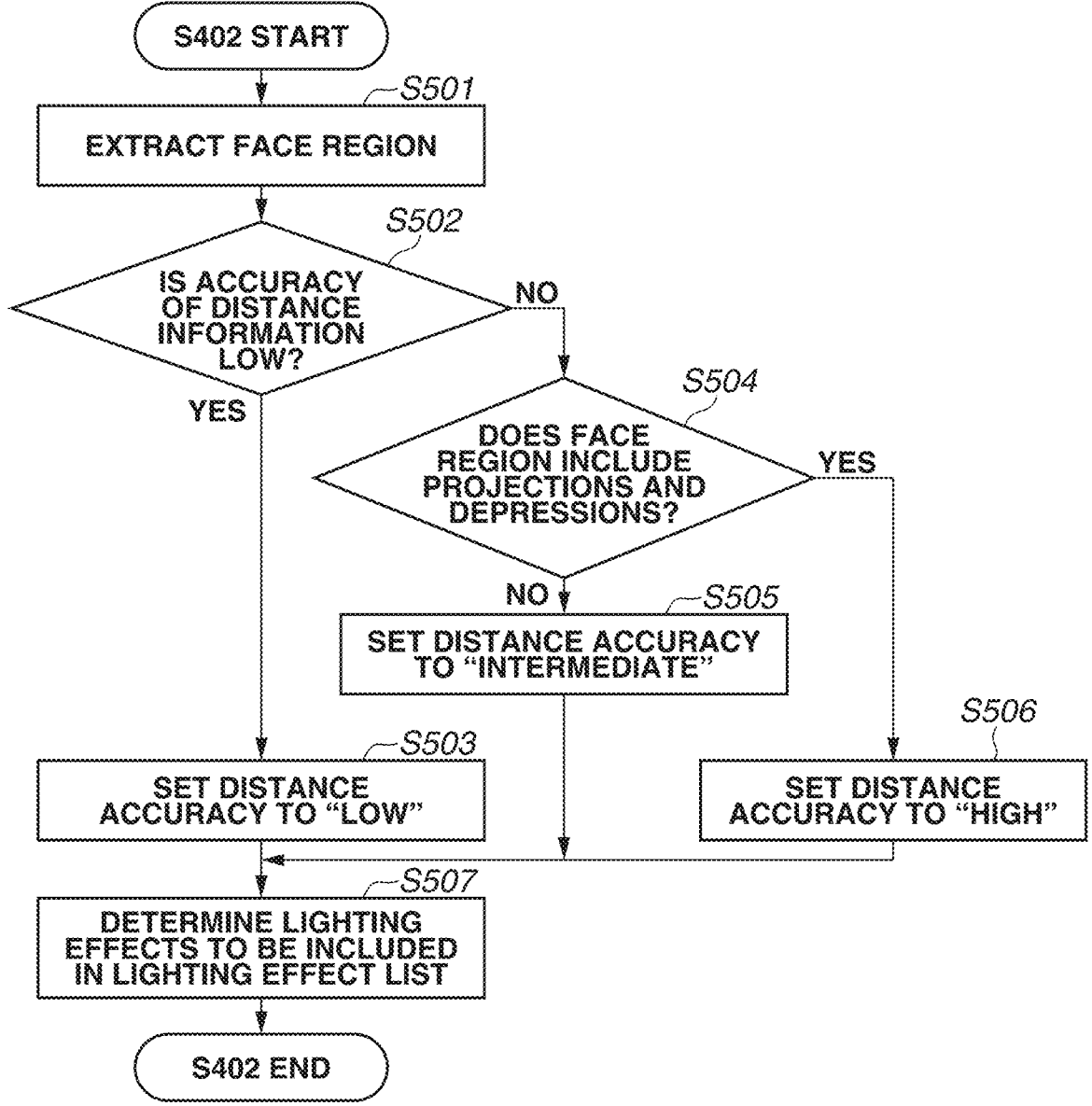
FIG. 5 is a flowchart illustrating processing for setting a lighting effect list.

The processing for determining the lighting effect list in step S402 will be described. FIG. 5 is a flowchart illustrating the processing for determining the lighting effect list. The lighting effect list determination unit 302 extracts a face region corresponding to the object's face in the color image, and sets distance accuracy based on distance values corresponding to the face region in the distance image. The lighting effect list determination unit 302 determines the lighting effects to be included in the lighting effect list based on the set distance accuracy.

In step S501, the lighting effect list determination unit 302 extracts a face region from the color image. FIG. 6A illustrates an example of the face region. A face region 601 can be extracted by using conventional methods, such as template matching and an algorithm using Haar-like feature amounts. In step S502, the lighting effect list determination unit 302 determines the accuracy of the distance information corresponding to the face region 601 in the distance image. Specifically, the lighting effect list determination unit 302 obtains distance values in the face region 601 from the distance image corresponding to the color image. If the face region 601 includes more than or equal to a predetermined number of pixels having a distance value greater than a predetermined value, the distance accuracy is determined to be low (YES in step S502) and the processing proceeds to step S503. If the face region 601 includes less than the predetermined number of pixels having a distance value greater than the predetermined value, the distance accuracy is determined to be high (NO in step S502) and the processing proceeds to step S504. In the present exemplary embodiment, the pixels having a distance value greater than the predetermined value are regarded as pixels corresponding to the background in the color image.

In step S503, the lighting effect list determination unit 302 sets the distance accuracy to "low". FIG. 6B illustrates an example of the distance image where the distance accuracy is determined to be "low". In the distance image of FIG. 6B, all the pixels within the face region 601 have a pixel value representing the background. In step S504, the lighting effect list determination unit 302 determines whether the face region 601 includes projections and depressions. Specifically, the lighting effect list determination unit 302 determines whether the distance values of the pixels within the face region 601 have a variance less than a predetermined value. With such a determination, the accuracy of the distance information can be determined based on whether the distance image includes information about fine projections and depressions in the object's face. If the distance values of the pixels within the face region 601 have a variance (dispersion) less than a predetermined value, the face region 601 is determined to include no projections and depressions (NO in step S504) and the processing proceeds to step S505. If the distance values of the pixels within the face region 601 have a variance greater than or equal to the predetermined value, the face region 601 is determined to include projections and depressions (YES in step S504) and the processing proceeds to step S506.

In step S505, the lighting effect list determination unit 302 sets the distance accuracy to "intermediate". FIG. 6C illustrates an example of the distance image where the distance accuracy is determined to be "intermediate". In the distance image of FIG. 6C, all the pixels within the face region 601 have the same distance value. In step S506, the lighting effect list determination unit 302 sets the distance accuracy to "high". FIG. 6D illustrates an example of the distance image where the distance accuracy is determined to be "high". In the distance image of FIG. 6D, the pixels in the face region 601 have various distance values depending on the shape of the object's face.

In step S507, the lighting effect list determination unit 302 determines the lighting effects to be included in the lighting effect list based on the distance accuracy. FIG. 7 illustrates an example of a method for setting the lighting effects based on the distance accuracy. In the present exemplary embodiment, the lighting effects to be included in the lighting effect list are determined from among four types of lighting effects "off", "emphasis on face", "emphasis on object", and "specify light source position" based on the distance accuracy. In the present exemplary embodiment, the higher the distance accuracy, the more lighting effects are included in the lighting effect list. Specifically, the distance accuracy is "low" in situations where no distance information having sufficient accuracy to distinguish the foreground from the background is obtained or no distance information is obtained at all. In such a case, the lighting effect "emphasis on object" for which a distinction between the foreground and the background (in units of meters) is necessary and the lighting effect "specify light source position" for which identification of projections and depressions, such as eyes and the nose, (in units of centimeters) is necessary are not appropriate. By contrast, the lighting effect "emphasis on face" can be implemented based on information obtained by face detection on the color image. If the distance accuracy is "low", the lighting effects "off" and "emphasis on face" are therefore included in the lighting effect list as effective lighting effects. The distance accuracy is "intermediate" in situations where distance information capable of distinguishing the foreground from the background (in units of meters) but not identification of projections and depressions, such as eyes and the nose, (in units of centimeters) is obtained. If the distance accuracy is "intermediate", the lighting effects "off", "emphasis on face", and "emphasis on object" except "specify light source position" are therefore included in the lighting effect list as effective lighting effects. The distance accuracy is "high" in situations where distance information having sufficient accuracy to identify projections and depressions, such as eyes and the nose, (in units of centimeters) is obtained. In such a case, all the foregoing four types of lighting effects are included in the lighting effect list. In short, the lighting effect list determination unit 302 includes "off" and "emphasis on face" in the lighting effect list if the distance accuracy is "low". The lighting effect list determination unit 302 includes "off", "emphasis on face", and "emphasis on object" in the lighting effect list if the distance accuracy is "intermediate". The lighting effect list determination unit 302 includes "off", "emphasis on face", "emphasis on object", and "specify light source position" in the lighting effect list if the distance accuracy is "high". A lighting effect to be applied to the color image can be selected from among the effective lighting effects determined based on the distance accuracy through such processing.

<Processing for Correcting Color Image (Step S404)>

Figure 8:
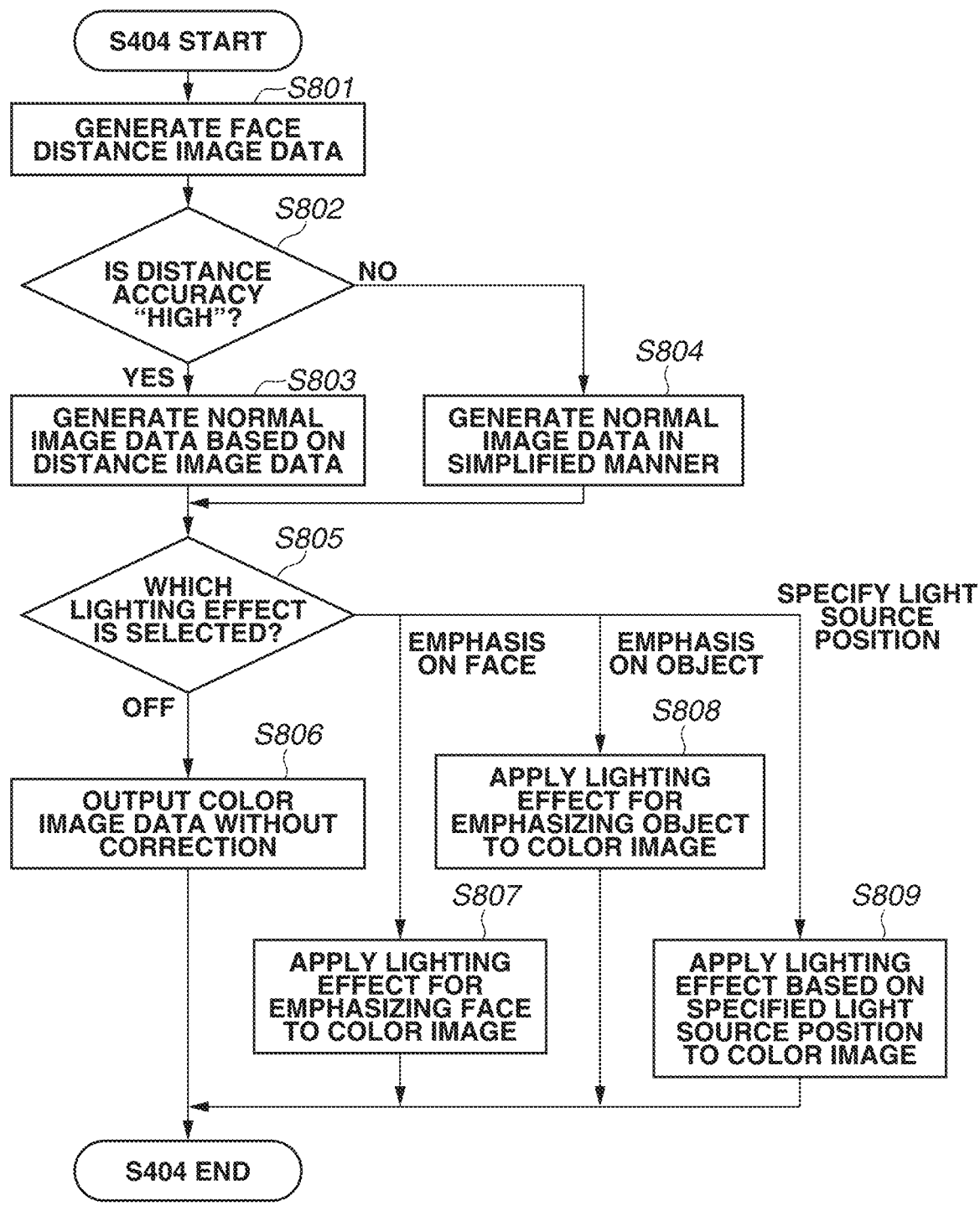
FIG. 8 is a flowchart illustrating processing for adding a lighting effect to an image.

The processing for correcting the color image in step S404 will be described. FIG. 8 is a flowchart illustrating the processing for correcting the color image. The lighting processing unit 304 generates normal image data based on the distance image data. The lighting processing unit 304 corrects the color image based on the distance image data and the normal image data.

Figure 9A:
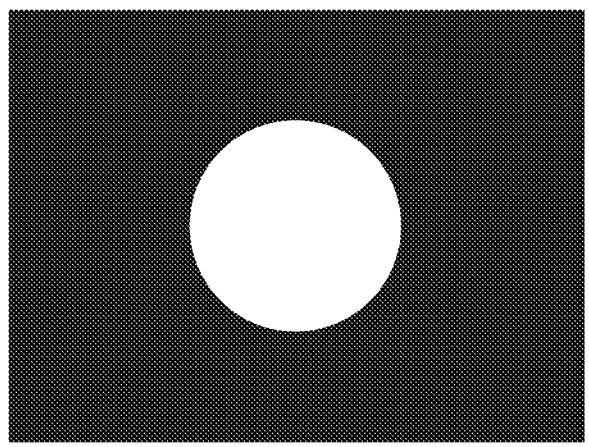
FIGS. 9A, 9B, and 9C are diagrams illustrating examples of face distance image data and normal image data.

In step S801, the lighting processing unit 304 generates face distance image data based on the distance image data. The face distance image data is distance image data where an area corresponding to the face region 601 serves as a foreground area, and the other areas as a background area. In the present exemplary embodiment, the lighting processing unit 304 sets an elliptical area including the face region 601 on the distance image represented by the distance image data. The lighting processing unit 304 then generates, as the face distance image data, distance image data that represents a distance image where the pixels inside the set elliptical area have a distance value representing the foreground and the other pixels have a distance value representing the background. FIG. 9A illustrates an example of the face distance image data. In step S802, the lighting processing unit 304 determines whether the distance accuracy set in step S402 is "high". If the distance accuracy is "high" (YES in step S802), the processing proceeds to step S803. In other cases (NO in step S802), the processing proceeds to step S804.

In step S803, the lighting processing unit 304 generates normal image data based on the distance image data. The normal image data is image data representing a normal image where each pixel includes a normal vector to the surface of the object. Specifically, the lighting processing unit 304 calculates three-dimensional coordinate values of each pixel based on two-dimensional coordinate values of the pixel in the distance image and the distance value included in the pixel. The lighting processing unit 304 calculates a normal vector corresponding to each pixel based on the calculated three-dimensional coordinate values. The normal vector can be calculated by using a calculation method based on a gradient calculated from the three-dimensional coordinate values or a method of applying a plane to each pixel and determining the perpendicular thereto as the normal vector.

The lighting processing unit 304 according to the present exemplary embodiment calculates an approximate plane corresponding to a neighboring area of a pixel of interest, and calculates a vector perpendicular to the approximate plane as the normal vector of the pixel of interest. The procedure will be described below. Assume that the three-dimensional coordinate values of a pixel of interest for which a normal vector is to be calculated and the three-dimensional coordinate values of neighboring pixels thereof are $(x_0, y_0, z_0), \ldots, (x_{n-1}, y_{n-1}, z_{n-1})$, respectively. The x coordinate values are calculated based on horizontal two-dimensional coordinate values of the distance image. The y coordinate values are calculated based on vertical two-dimensional coordinate values of the distance image. The z coordinate values are calculated based on the pixel values of the distance image. A plane ax+by+c=z is applied to the coordinate values of the pixel of interest and the coordinate values of the neighboring pixels thereof. Specifically, a, b, and c that minimize a function E given by Eq. (1) are calculated by using the distance values in the z-axis direction:

$$E=\Sigma_i(ax_i+by_i+c-z_i)^2 \qquad \text{Eq. (1)}$$

a, b, and c are calculated by using Eq. (2):

$$\begin{bmatrix} a \\ b \\ c \end{bmatrix} = \begin{bmatrix} \Sigma_i x_i^2 & \Sigma_i x_i y_i & \Sigma_i x_i \\ \Sigma_i x_i y_i & \Sigma_i x_i^2 & \Sigma_i y_i \\ \Sigma_i x_i & \Sigma_i y_i & n \end{bmatrix}^{-1} \begin{bmatrix} \Sigma_i x_i z_i \\ \Sigma_i y_i z_i \\ \Sigma_i z_i \end{bmatrix}. \qquad \text{Eq. (2)}$$

A vector $n=(n_x, n_y, n_z)$ perpendicular to the plane $ax+by+c=z$ is calculated by using Eq. (3):

$$n_x = \frac{a}{\sqrt{a^2+b^2+1}} \qquad \text{Eq. (3)}$$
$$n_y = \frac{b}{\sqrt{a^2+b^2+1}}$$
$$n_z = \frac{-1}{\sqrt{a^2+b^2+1}}$$

Figure 9B:
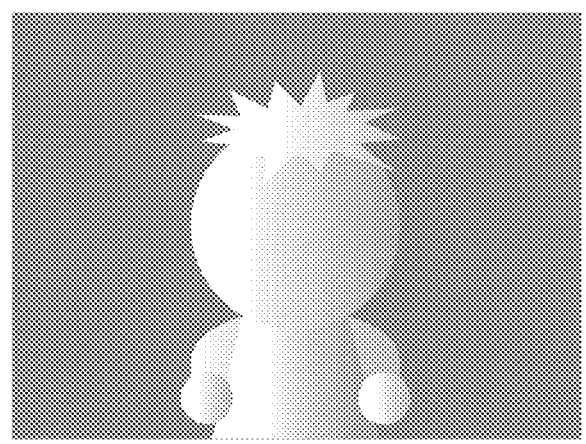

The vector $n=(n_x, n_y, n_z)$ calculated by using Eq. (3) is the normal vector corresponding to the pixel of interest. The normal image data is generated by performing similar processing on each pixel of the distance image. The normal image data is image data representing a normal image where pixels (i, j) have respective normal vectors ($n_x(i, j)$, $n_y(i, j)$, $n_z(i, j)$). FIG. 9B illustrates an example of the normal image represented by the generated normal image data.

Figure 9C:
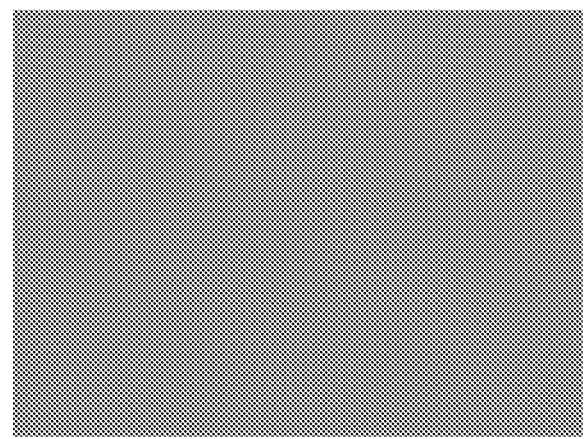

In step S804, the lighting processing unit 304 generates normal image data in a simplified manner. In the present exemplary embodiment, the lighting processing unit 304 generates normal image data representing a normal image where all the pixels have a normal vector n=(0, 0, 1). FIG. 9C illustrates an example of the normal image data generated in a simplified manner. The lighting processing unit 304 may obtain normal image data generated in advance from the storage unit 307. In step S805, the lighting processing unit 304 determines which lighting effect is selected in step S403. If the selected lighting effect is "off" (OFF in step S805), the processing proceeds to step S806. If the selected lighting effect is "emphasis on face" (EMPHASIS ON FACE in step S805), the processing proceeds to step S807. If the selected lighting effect is "emphasis on object" (EMPHASIS ON OBJECT in step S805), the processing proceeds to step S808. If the selected lighting effect is "specify light source position" (SPECIFY LIGHT SOURCE POSITION in step S805), the processing proceeds to step S809.

In step S806, the lighting processing unit 304 outputs the color image data to the image display control unit 305 without correcting the color image. The output color image data is handled as corrected image data. In step S807, the lighting processing unit 304 corrects the color image based on the distance image data and the normal image data. In step S807, the lighting processing unit 304 applies a lighting effect for emphasizing the face to the color image through processing for correcting the color image (described below). The lighting processing unit 304 outputs the corrected image data representing the corrected color image to the image display control unit 305.

In step S808, the lighting processing unit 304 corrects the color image based on the distance image data and the normal image data. In step S808, the lighting processing unit 304 applies a lighting effect for darkening the background to emphasize the object on the foreground to the color image through the processing for correcting the color image (described below). The lighting processing unit 304 outputs the corrected image data representing the corrected color image to the image display control unit 305. In step S809, the lighting processing unit 304 corrects the color image based on the distance image data and the normal image data. In step S809, the lighting processing unit 304 applies a lighting effect based on the light source position specified by the user to the color image through the processing for correcting the color image (described below). The lighting processing unit 304 outputs the corrected image data representing the corrected color image to the image display control unit 305.

<Processing for Correcting Color Image (Steps S807, S808, and S809)>

The processing for correcting the color image in steps S807, S808, and S809 will be described. The lighting processing unit 304 switches parameters to be used for correction based on the lighting effect to be applied to the color image. A lighting effect for emphasizing a three-dimensional appearance by shading the object as if illuminated with light in a desired direction and a lighting effect for darkening the background to emphasize the object on the foreground as if spotlighted can thus be applied to the object through the same processing procedure. An example of the specific processing procedure will now be described. Initially, the lighting processing unit 304 corrects the brightness of the background of the color image according to Eq. (4):

$$I'=(1-\beta)I+\beta D(d)I, \qquad \text{Eq. (4)}$$

where I is a pixel value of the color image, and I' is a pixel value of the color image with the brightness of the background having been corrected.

β is a parameter for adjusting the darkness of the background. D is a function based on a pixel value (distance value) d of the distance image. The greater the distance value d, the smaller the value of the function D. D takes values from 0 to 1. Specifically, D takes greater values for distance values representing the foreground, and smaller values for distance values representing the background. β is set to a value of 0 to 1. The closer to 1 the parameter β is, the darker the background of the color image is corrected to be. By correcting the color image according to Eq. (4), only pixels where the distance value d is large and D is less than 1 can be darkened based on the parameter β.

Next, the lighting processing unit 304 adds shades based on the distance image data and the normal image data to the color image having the brightness-corrected background according to Eq. (5):

$$I''=I'+\alpha D(d)H(n,L)I', \qquad \text{Eq. (5)}$$

where I" is a pixel value of the shaded color image.

α is a parameter for adjusting the brightness of the virtual light source. L is a light source vector indicating a direction from the object to the virtual light source. H is a function based on the pixel value (normal vector) n of the normal image and the light source vector L. The smaller the angle formed between the normal vector n and the light source vector L, the greater the value of the function H. H takes values from 0 to 1. For example, H can be given by Eq. (6):

$$H = \begin{cases} n \cdot L & n \cdot L \geq 0 \\ 0 & \text{otherwise} \end{cases}. \quad \text{Eq. (6)}$$

In steps S807, S808, and S809, the foregoing parameters are changed based on the selected lighting effect.

In step S807, the lighting processing unit 304 sets D based on the distance values of the face distance image. This enables an emphasis on the face region. In step S808, the lighting processing unit 304 sets D based on the distance values of the distance image. The lighting processing unit 304 also sets β to a value less than 1. In such a manner, the background can be darkened to emphasize the object on the foreground. In step S809, the lighting processing unit 304 sets D based on the distance values of the distance image. The lighting processing unit 304 also sets the parameters including the light source vector L based on user operations. For example, the light source vector L is obtained by calculating a three-dimensional vector based on vertical and horizontal rotation angles that are set with respect to the object based on user operations. A lighting effect based on the light source position specified by the user can thus be applied to the color image.

<Processing for Displaying Lighting Effects (Step S406)>

Figure 10:
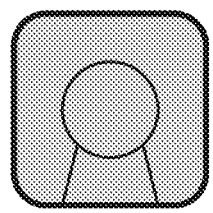
FIG. 10 is a diagram illustrating examples of icons representing lighting effects.
Figure 10:
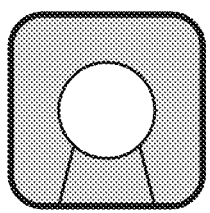
Figure 10:
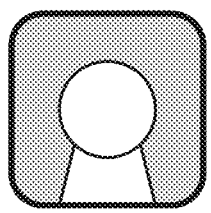
Figure 10:
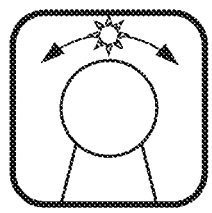
Figure 11A:
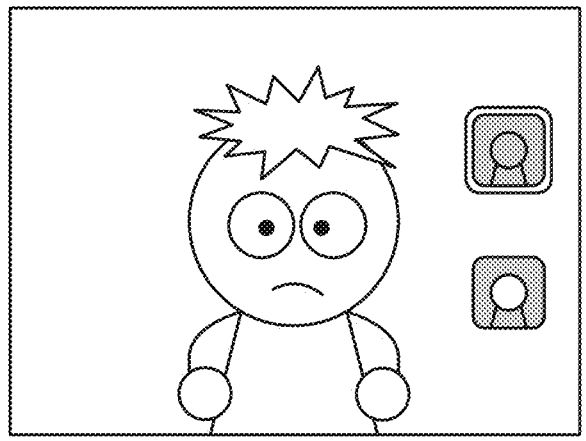
FIGS. 11A, 11B, and 11C are diagrams illustrating examples of a display image when a lighting effect is applied to an image.
Figure 11B:
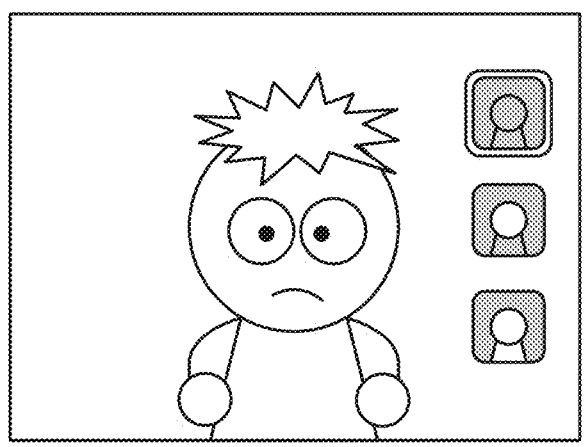
Figure 11C:
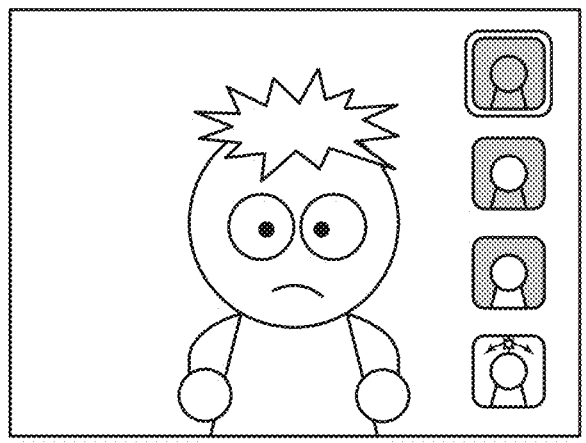

The processing for displaying candidates for a lighting effect in step S406 will be described. FIG. 10 illustrates examples of icons corresponding to the lighting effects ("off", "emphasis on face", "emphasis on object", and "specify light source position") according to the present exemplary embodiment. The lighting effect display control unit 306 displays the icons corresponding to the respective lighting effects based on the group of lighting effects included in the lighting effect list. FIGS. 11A, 11B, and 11C illustrate display examples of the lighting effects. The lighting effect display control unit 306 displays icons corresponding to applicable lighting effects. If the distance accuracy is "low", the lighting effect display control unit 306 displays the icons corresponding to "off" and "emphasis on face" as illustrated in FIG. 11A. If the distance accuracy is "intermediate", the lighting effect display control unit 306 displays the icons corresponding to "off", "emphasis on face", and "emphasis on object" as illustrated in FIG. 11B. If the distance accuracy is "high", the lighting effect display control unit 306 displays the icons corresponding to "off", "emphasis on face", "emphasis on object", and "specify light source position" as illustrated in FIG. 11C. The icon of the selected lighting effect is displayed in a frame or in a different color for the sake of distinction from the icons of the other unselected lighting effects.

Figure 12A:
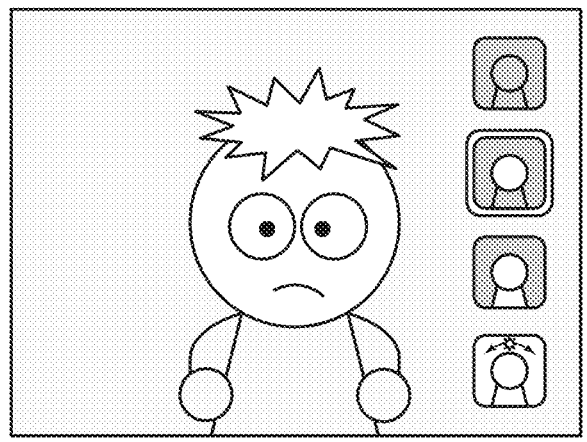
FIGS. 12A, 12B, and 12C are diagrams illustrating examples of the display image when a lighting effect is applied to an image.
Figure 12B:
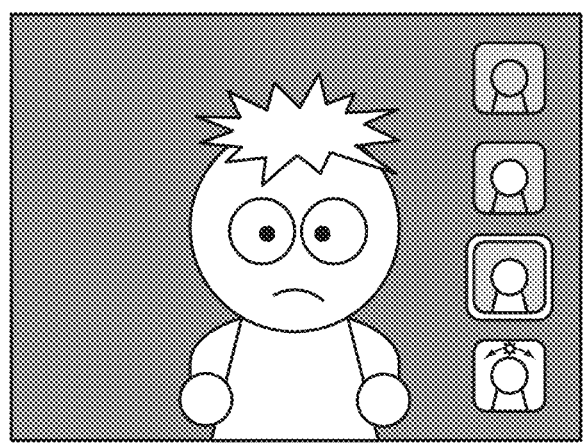
Figure 12C:
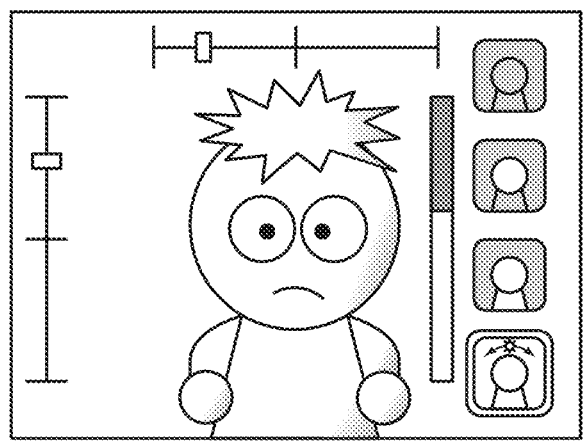

FIGS. 11A, 11B, and 11C illustrate examples of cases where the lighting effect "off" is selected. FIGS. 12A, 12B, and 12C illustrate examples of cases where a different lighting effect is selected. FIG. 12A illustrates an example of a display image in a case where "emphasis on face" is selected. In such a case, a corrected image where the face region is emphasized is displayed. FIG. 12B illustrates an example of the display image in a case where "emphasis on object" is selected. In such a case, a corrected image where the background has been darkened to emphasize the object is displayed. FIG. 12C illustrates an example of the display image in a case where "specify light source position" is selected. In such a case, a corrected image based on the lighting parameters specified by the user is displayed. Sliders for adjusting the lighting parameters are also displayed on the corrected image in a superimposed manner. In the present exemplary embodiment, sliders for adjusting the position of the virtual light source and a slider for adjusting the brightness of the virtual light source are displayed. The sliders displayed here are moved by the user's touch operations having been detected.

<Effects of First Exemplary Embodiment>

As described above, the information processing apparatus 1 according to the present exemplary embodiment obtains image data representing an image and distance information corresponding to the image data. The information processing apparatus 1 determines, based on the accuracy of the distance information, candidates for a lighting effect applicable to the image in applying a lighting effect based on the distance information to the image. The information processing apparatus 1 can thus determine appropriate candidates for a lighting effect to apply a lighting effect to the image based on distance information about the object. Presenting the determined candidates for the lighting effect to the user can prevent lighting effects unintended by the user from being applied to the image because of a mismatch between the lighting effects applicable based on the accuracy of the distance information and the lighting effect intended by the user.

<Modifications>

In the present exemplary embodiment, it is determined that the distance accuracy is low in step S502 if the face region 601 includes more than or equal to a predetermined number of pixels having a distance value representing the background. However, the distance accuracy can also be determined to be low if there is no distance image data corresponding to the color image data.

In the information processing apparatus 1 according to the present exemplary embodiment, the image display control unit 305 controls an image display and the lighting effect display control unit 306 controls display of the effective lighting effects. However, the information processing apparatus 1 may include a single display control unit. In such a case, the single display control unit included in the information processing apparatus 1 controls both the image display and the display of the effective lighting effects.

In the present exemplary embodiment, the effective lighting effects are displayed on the input/output unit 309 for user presentation. However, the method for presenting the effective lighting effects is not limited to the foregoing example. For example, the effective lighting effects may be presented to the user by using sound. In such a case, the four icons illustrated in FIG. 10 are displayed on the input/output unit 309. A warning sound may be output if a touch on an icon is detected and the touched icon does not represent an effective lighting effect included in the lighting effect list.

In the present exemplary embodiment, the distance accuracy is set in three levels in the processing for determining the lighting effect list. However, the distance accuracy may be set in two levels or in four or more levels.

In the present exemplary embodiment, the distance accuracy is determined based on the distance values in the face region. However, the distance accuracy may be determined based on distance values other than in the face region. For example, the distance accuracy may be determined based on distance values in a separately-extracted personal region, or based on distance values in a region below the face region as well as those in the face region. The region used to determine the distance accuracy may be specified by the user via the input/output unit 309.

Figure 1B:
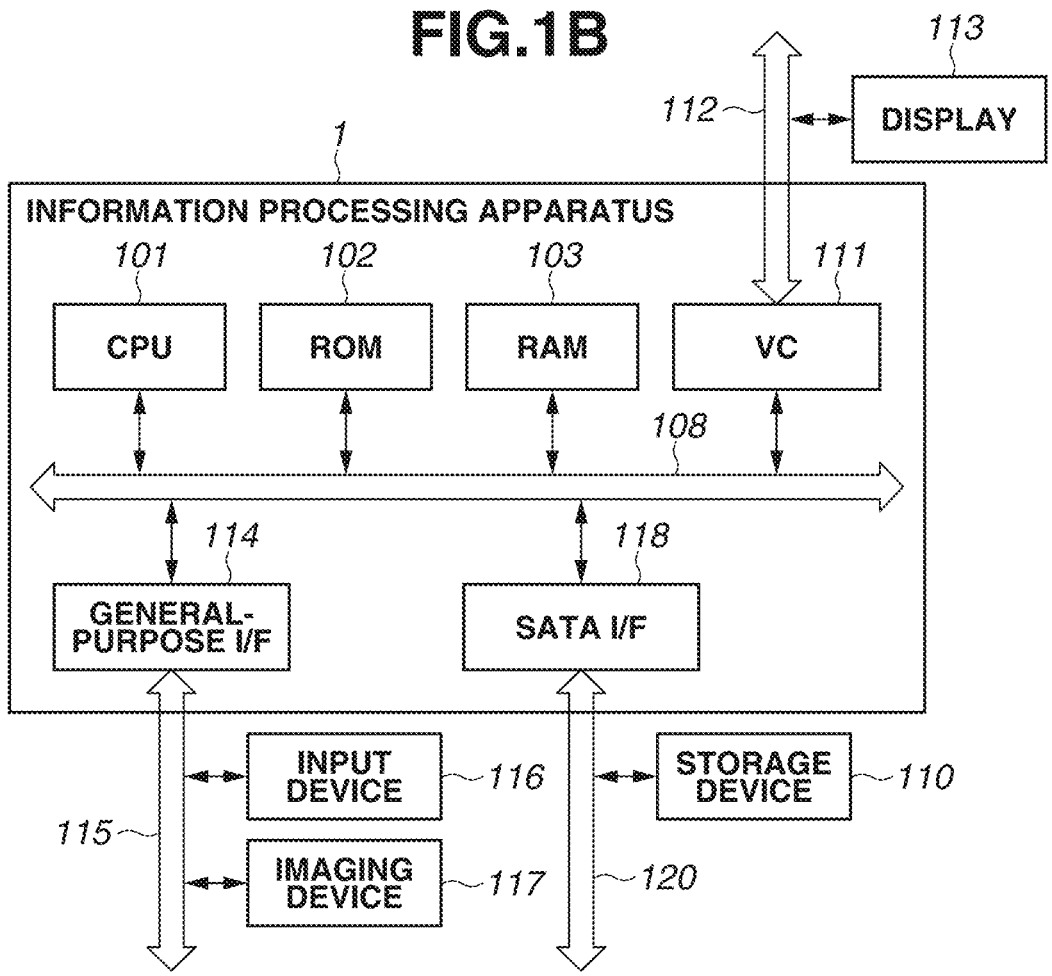

A second exemplary embodiment of the disclosure will be described below. In the first exemplary embodiment, the distance accuracy is set based on the distance image data. In the present exemplary embodiment, distance accuracy is set based on imaging device information attached to image data as tag information. FIG. 1B illustrates a hardware configuration of an information processing apparatus 1 according to the present exemplary embodiment. Specifically, in the present exemplary embodiment, the information processing apparatus 1 does not include a built-in imaging unit and obtains image data from outside. The information processing apparatus 1 has a similar logical configuration to that of the first exemplary embodiment. A description thereof will thus be omitted. Differences between the present exemplary embodiment and the first exemplary embodiment will mainly be described below. In the following description, components similar to those of the first exemplary embodiment are designated by the same reference numerals.

<Processing Performed by Information Processing Apparatus 1>

The present exemplary embodiment differs from the first exemplary embodiment in the processing for determining a lighting effect list in step S402. The lighting effect list determination unit 302 according to the present exemplary embodiment determines the distance accuracy based on imaging device information attached to the image data. The imaging device information includes an imaging device name, information about whether the imaging device can obtain distance information, and a method for obtaining the distance information. Imaging devices that project light on an object to obtain distance information are capable of obtaining the distance information at the highest accuracy, compared to other imaging devices. Imaging devices that obtain distance information by other methods are capable of obtaining the distance information at the next highest accuracy. Imaging devices not capable of obtaining distance information have the lowest accuracy of distance information. Details of the processing for determining a lighting effect list will now be described.

<Processing for Determining Lighting Effect List (Step S402)>

Figure 13:
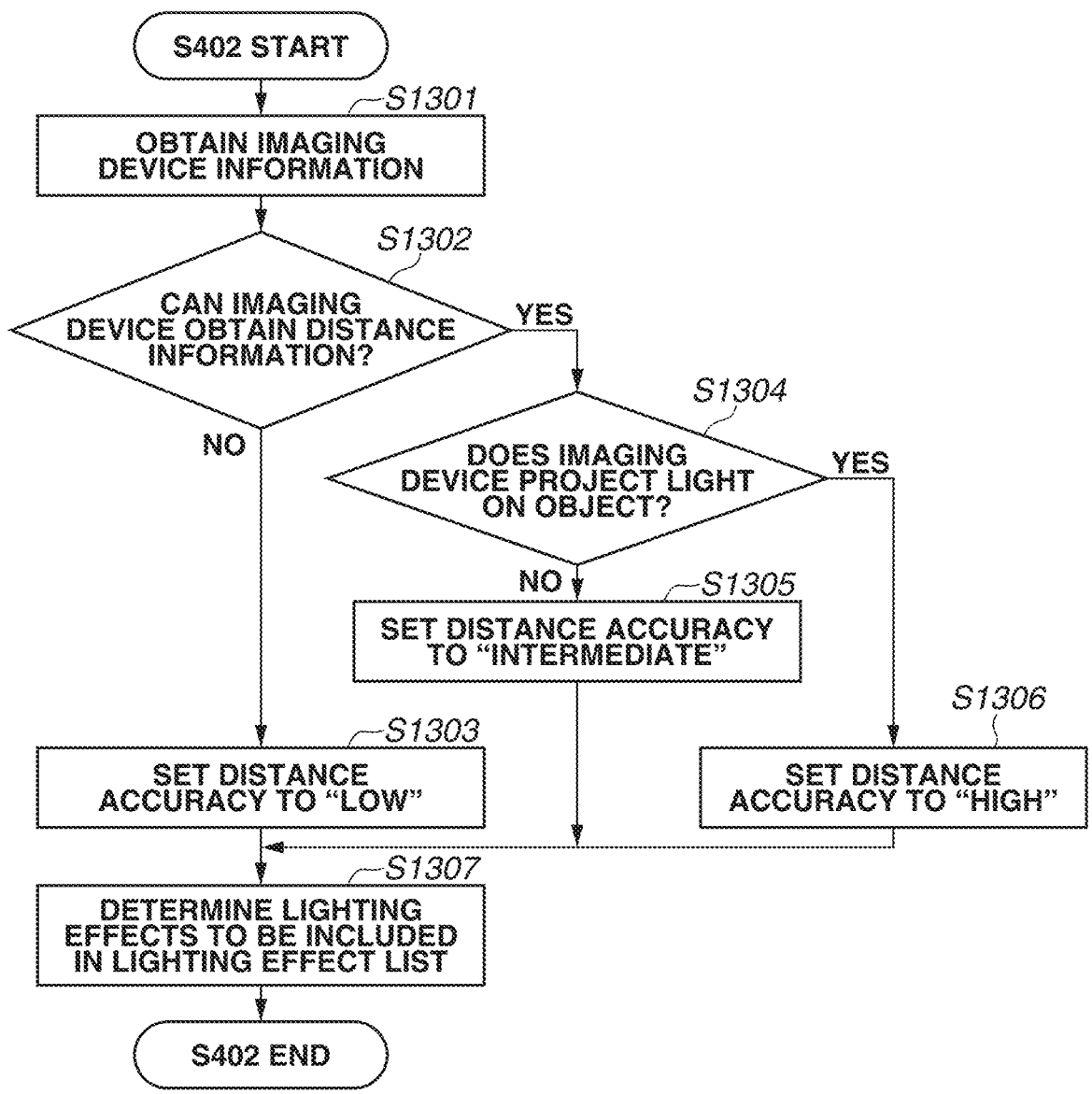
FIG. 13 is a flowchart illustrating processing for setting the lighting effect list.

FIG. 13 is a flowchart illustrating the processing for determining the lighting effect list. In step S1301, the lighting effect list determination unit 302 obtains the imaging device information from the tag information attached to the color image data. The imaging device information is information for identifying an imaging device 117 used to generate the color image data and the distance image data. In step S1302, the lighting effect list determination unit 302 determines whether the imaging device 117 can obtain distance information based on the imaging device information. If the imaging device 117 can obtain distance information (YES in step S1302), the processing proceeds to step S1304. If the imaging device 117 is unable to obtain distance information (NO in step S1302), the processing proceeds to step S1303.

In step S1303, the lighting effect list determination unit 302 sets the distance accuracy to "low". In step S1304, the lighting effect list determination unit 302 determines whether the imaging device 117 projects light on the object to obtain distance information. If the imaging device 117 does not project light on the object (NO in step S1304), the processing proceeds to step S1305. If the imaging device 117 projects light on the object (YES in step S1304), the processing proceeds to step S1306. Examples of the imaging device that projects light on the object to obtain distance information include a camera that captures an image of a specific pattern projected on the object and measures distance based on the amount of change of the pattern, and a camera that measures distance based on the time of flight of the light projected on the object. Examples of the imaging device that does not project light on the object to obtain distance information include a camera that obtains distance information based on a parallax.

In step S1305, the lighting effect list determination unit 302 sets the distance accuracy to "intermediate". In step S1306, the lighting effect list determination unit 302 sets the distance accuracy to "high". In step S1307, the lighting effect list determination unit 302 determines the lighting effects to be included in the lighting effect list based on the distance accuracy. The processing of step S1307 is similar to that of step S507 according to the first exemplary embodiment. A description thereof will thus be omitted.

<Effect of Second Exemplary Embodiment>

As described above, the information processing apparatus 1 according to the present exemplary embodiment determines the accuracy of the distance information based on whether the imaging device 117 corresponding to the image data has a function of obtaining distance information. The information processing apparatus 1 can thus determine appropriate candidates for the lighting effect to apply a lighting effect to the image based on the distance information about the object.

<Modifications>

Figure 28:
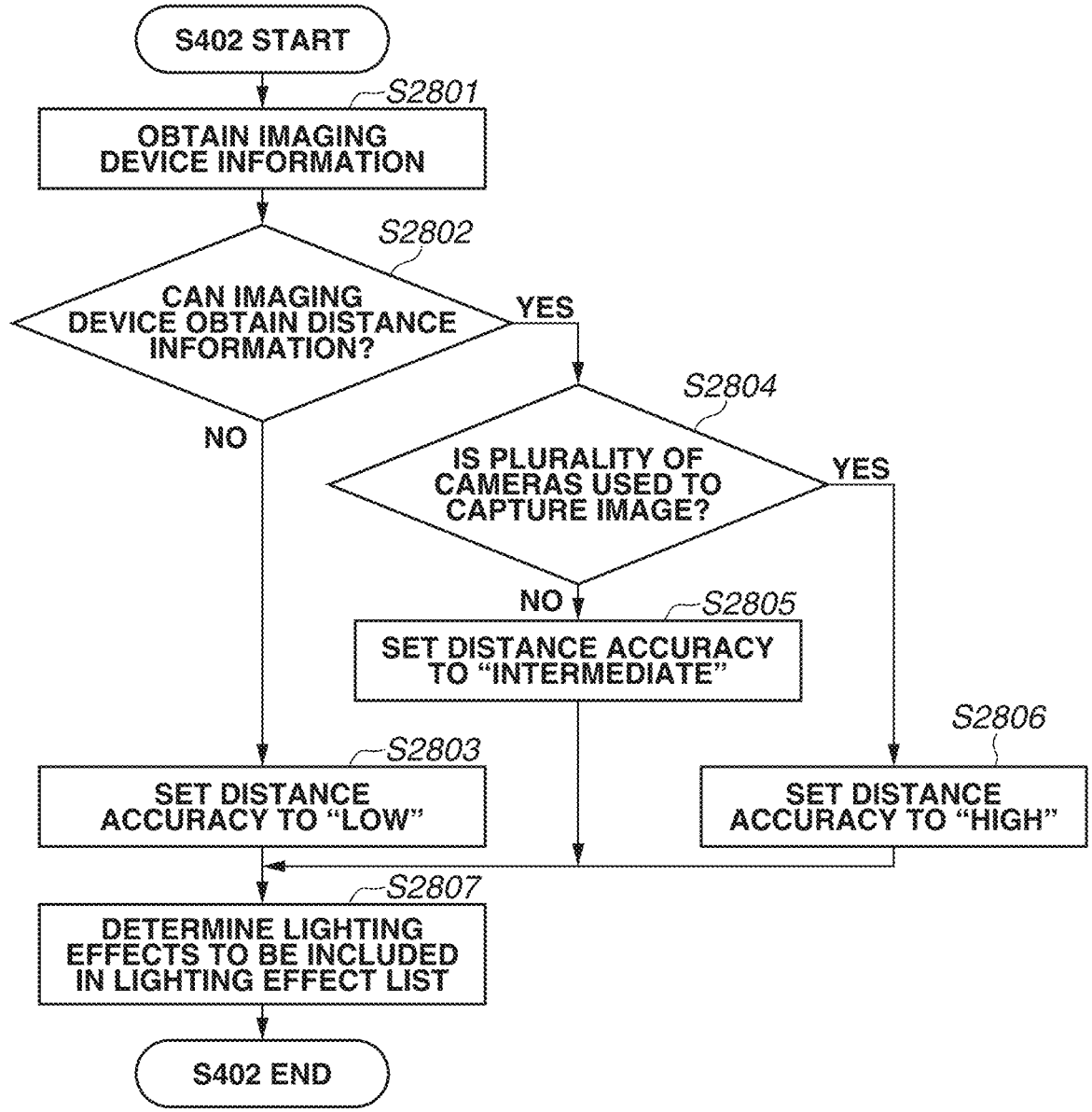
FIG. 28 is a flowchart illustrating processing for setting a lighting effect list.

In the present exemplary embodiment, the distance accuracy is determined based on whether the imaging device 117 projects light on the object. However, the distance accuracy may be determined based on whether a plurality of cameras is used to capture an image. In such a case, a higher distance accuracy is set in a case where a plurality of cameras is used to capture an image than in a case where a single camera is used to capture an image. FIG. 28 is a flowchart illustrating the processing for determining the lighting effect list. A difference from FIG. 13 lies in step S2804. Steps S2801 to S2803 and step S2805 to S2807 are similar to steps S1301 to S1303 and steps S1305 to S1307, respectively, in FIG. 13, and therefore are not described. In step S2804, the lighting effect list determination unit 302 determines whether the imaging device 117 uses a plurality of cameras to capture an image of the object. If a single camera is used to capture an image (NO in step S2804), the processing proceeds to step S2805. If a plurality of cameras is used to capture an image (YES in step S2804), the processing proceeds to step S2806. If a single camera is used to capture an image, distance information can be obtained by known methods, such as ones based on the magnitude of a lens blur and based on a recognition result of the object in the captured image. If a plurality of cameras is used to capture an image, distance information can be obtained based on parallax information due to different camera positions, in addition to the magnitude of a blur and the recognition result of the object. Capturing an image using a plurality of cameras thus enables acquisition of more accurate distance information than using a single camera.

In the present exemplary embodiment, the distance accuracy is set based on whether distance information can be obtained and the method for obtaining the distance information. However, the distance accuracy may be set based on the imaging device name. In such a case, a table storing the correspondence between imaging device names and distance accuracies is prepared in advance. The lighting effect list determination unit 302 can set the distance accuracy based on the imaging device name corresponding to the color image data and the table prepared in advance.

In the present exemplary embodiment, the information processing apparatus 1 is described to have the hardware configuration illustrated in FIG. 1B. However, the present exemplary embodiment can also be applied if the information processing apparatus 1 has the hardware configuration illustrated in FIG. 1A. In particular, some information processing apparatuses 1 can obtain a plurality of different pieces of distance information by using a plurality of calculation methods using the imaging unit 106. In such a case, the method for obtaining the distance information is stored in the image data as tag information, so that the lighting effect list determination unit 302 can determine the lighting effect list as described in the present exemplary embodiment.

A third exemplary embodiment of the disclosure will be described below. In the first exemplary embodiment, the distance accuracy is set based on the distance image data. In the present exemplary embodiment, the distance accuracy is set based on a distance from the imaging unit 106 to the position of the focused object during imaging (hereinafter, referred to as an object distance). An information processing apparatus 1 according to the present exemplary embodiment has a hardware configuration and logical configuration similar to those of the first exemplary embodiment. A description thereof will thus be omitted. Differences between the present exemplary embodiment and the first exemplary embodiment will mainly be described below. In the following description, components similar to those of the first exemplary embodiment are designated by the same reference numerals.

<Processing Performed by Information Processing Apparatus 1>

The present exemplary embodiment differs from the first exemplary embodiment in the processing for determining the lighting effect list in step S402. The lighting effect list determination unit 302 according to the present exemplary embodiment determines the distance accuracy based on object distance information corresponding to the color image data. The object distance information indicates a distance value (object distance) from the imaging unit 106 to the position of the focused object during imaging. The smaller the object distance, the higher the lighting effect list determination unit 302 determines the distance accuracy to be. Specifically, the lighting effect list determination unit 302 determines the distance accuracy by comparing the object distance with predetermined values L1 and L2 (L1>L2). Details of the processing for determining the lighting effect list will be described below.

<Processing for Determining Lighting Effect List (Step S402)>

Figure 14:
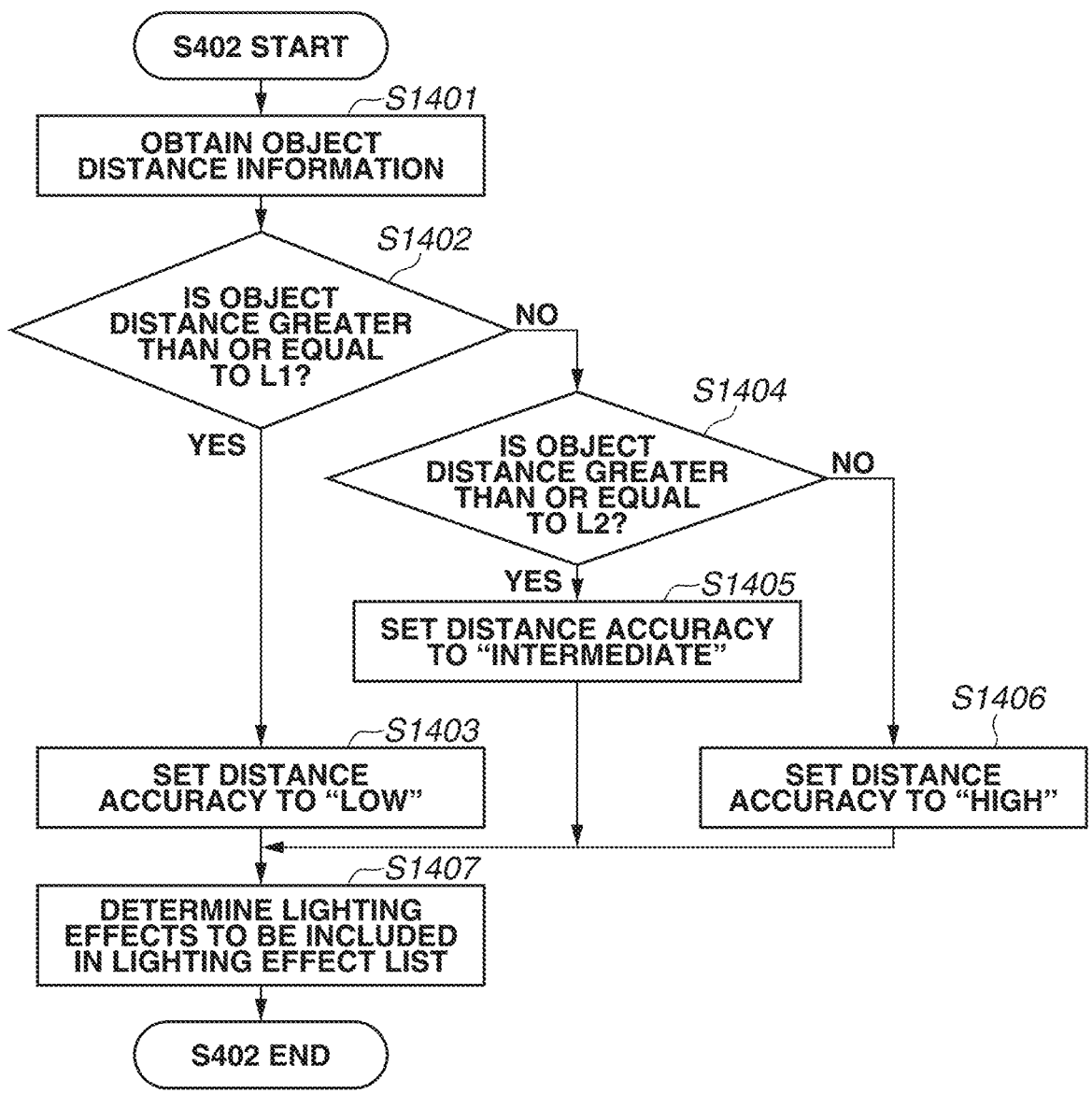
FIG. 14 is a flowchart illustrating processing for setting the lighting effect list.

FIG. 14 is a flowchart illustrating the processing for determining the lighting effect list. In step S1401, the lighting effect list determination unit 302 obtains the object distance information from the tag information attached to the color image data. In step S1402, the lighting effect list determination unit 302 determines whether the object distance is greater than or equal to L1. If the lighting effect list determination unit 302 determines that the object distance is greater than or equal to L1 (YES in step S1402), the processing proceeds to step S1403. If the lighting effect list determination unit 302 determines that the object distance is less than L1 (NO in step S1402), the processing proceeds to step S1404. In step S1403, the lighting effect list determination unit 302 sets the distance accuracy to "low".

In step S1404, the lighting effect list determination unit 302 determines whether the object distance is greater than or equal to L2. If the lighting effect list determination unit 302 determines that the object distance is greater than or equal to L2 (YES in step S1404), the processing proceeds to step S1405. If the lighting effect list determination unit 302 determines that the object distance is less than L2 (NO in step S1404), the processing proceeds to step S1406. In step S1405, the lighting effect list determination unit 302 sets the distance accuracy to "intermediate". In step S1406, the lighting effect list determination unit 302 determines the distance accuracy to "high". In step S1407, the lighting effect list determination unit 302 determines the lighting effects to be included in the lighting effect list based on the distance accuracy. The processing of step S1407 is similar to that of step S507 according to the first exemplary embodiment. A description thereof will thus be omitted.

<Effect of Third Exemplary Embodiment>

As described above, the information processing apparatus 1 according to the present exemplary embodiment determines the accuracy of the distance information based on the object distance information corresponding to the image data. The information processing apparatus 1 can thus determine appropriate the candidates for the lighting effect to apply a lighting effect to the image based on the distance information about the object.

A fourth exemplary embodiment of the disclosure will be described below. In the first exemplary embodiment, the distance accuracy is set based on the distance image data. In the present exemplary embodiment, the distance accuracy is set based on a captured scene. An information processing apparatus 1 according to the present exemplary embodiment has a hardware configuration and logical configuration similar to those of the first exemplary embodiment. A description thereof will thus be omitted. Differences between the present exemplary embodiment and the first exemplary embodiment will mainly be described below. In the following description, components similar to those of the first exemplary embodiment are designated by the same reference numerals.

<Processing Performed by Information Processing Apparatus 1>

The present exemplary embodiment differs from the first exemplary embodiment in the processing for determining the lighting effect list in step S402. The lighting effect list determination unit 302 according to the present exemplary embodiment determines the distance accuracy based on the scene captured in capturing an image to obtain the color image data. The lighting effect list determination unit 302 determines the captured scene based on the presence or absence of a person and the presence or absence of motion. In the present exemplary embodiment, the target to apply a lighting effect is a person. Scenes including no person are therefore given the lowest distance accuracy. Motionless scenes including a person have the highest distance accuracy. Scenes with motion including a person have the next highest distance accuracy. Details of the processing for determining the lighting effect list will be described below.

<Processing for Determining Lighting Effect List (Step S402)>

Figure 15:
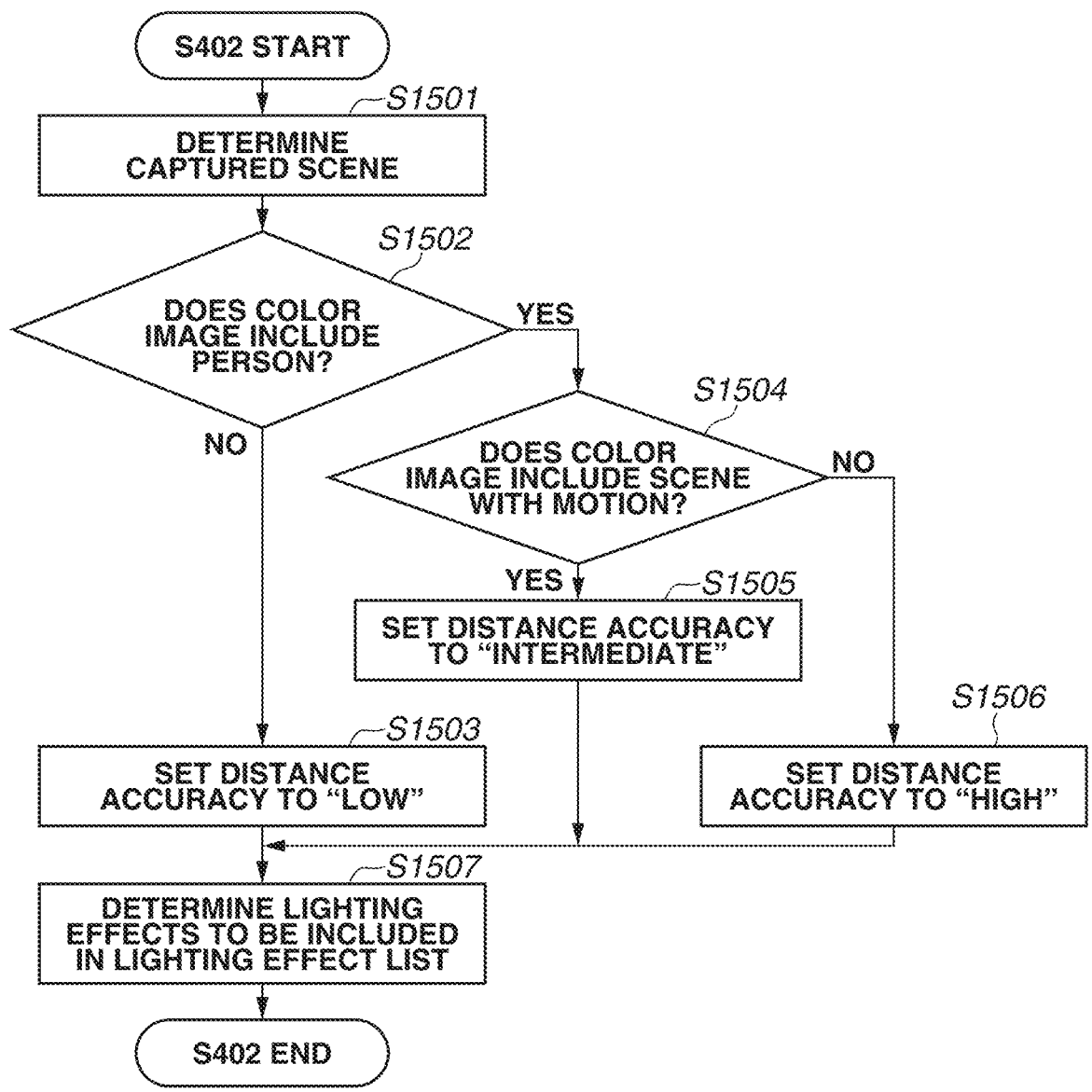
FIG. 15 is a flowchart illustrating processing for setting the lighting effect list.

FIG. 15 is a flowchart illustrating the processing for determining the lighting effect list. In step S1501, the lighting effect list determination unit 302 determines the captured scene based on the color image data. Specifically, the lighting effect list determination unit 302 determines whether the color image includes a person and whether the color image includes a scene with motion. The presence or absence of a person is determined based on the number of face regions detected in the color image. If the number of face regions is one or more, the lighting effect list determination unit 302 determines that the color image includes a person or persons. If no face region is detected, the lighting effect list determination unit 302 determines that the color image includes no person. Face regions are detected by using the same method as in the processing of step S501 according to the first exemplary embodiment. The presence or absence of motion is determined based on the intensity of high frequency components in the region corresponding to the object in the color image. If the intensity of the high frequency components is greater than or equal to a predetermined value, the lighting effect list determination unit 302 determines that the scene is motionless. If the intensity of the high frequency components is less than the predetermined value, the lighting effect list determination unit 302 determines that the scene includes motion. The intensity of the high frequency components refers to the sum total of the absolute values of the pixel values in the color image after application of an edge extraction filter, such as a Laplacian filter. The intensity of the high frequency components may be a power spectrum in a frequency domain derived by applying a conventional fast Fourier transform (FFT) to the color image. A color image may be captured immediately before or after the capturing of the target color image to which a lighting effect is applied, and the presence or absence of motion may be determined based on the magnitude of differences between the target color image and the color image captured immediately before or after. In such a case, the lighting effect list determination unit 302 determines that the scene is motionless if the difference is less than or equal to a predetermined value. The lighting effect list determination unit 302 determines that the scene includes motion if the difference is greater than the predetermined value.

In step S1502, the lighting effect list determination unit 302 obtains the determination result about the presence or absence of a person. If the lighting effect list determination unit 302 determines that the color image includes no person (NO in step S1502), the processing proceeds to step S1503. If the lighting effect list determination unit 302 determines that the color image includes a person (YES in step S1502), the processing proceeds to step S1504. In step S1503, the lighting effect list determination unit 302 sets the distance accuracy to "low". In step S1504, the lighting effect list determination unit 302 obtains the determination result about the presence or absence of motion. If the lighting effect list determination unit 302 determines that the color image includes a scene with motion (YES in step S1504), the processing proceeds to step S1505. If the lighting effect list determination unit 302 determines that the color image does not include a scene with motion (NO in step S1504), the processing proceeds to step S1506.

In step S1505, the lighting effect list determination unit 302 sets the distance accuracy to "intermediate". In step S1506, the lighting effect list determination unit 302 sets the distance accuracy to "high". In step S1507, the lighting effect list determination unit 302 determines the lighting effects to be included in the lighting effect list based on the distance accuracy. The processing of step S1507 is similar to that of step S507 according to the first exemplary embodiment. A description thereof will thus be omitted.

<Effect of Fourth Exemplary Embodiment>

As described above, the information processing apparatus 1 according to the present exemplary embodiment sets the distance accuracy based on the captured scene. Specifically, the distance accuracy is set based on whether the color image includes a person and whether the color image includes a temporary state of a moving object. The information processing apparatus 1 can thus determine appropriate candidates for the lighting effect to apply a lighting effect to the image based on the distance information about the object.

A fifth exemplary embodiment of the disclosure will be described below. In the first exemplary embodiment, the distance accuracy is set based on the distance image data. In the present exemplary embodiment, the distance accuracy is set based on preset personal information. An information processing apparatus 1 according to the present exemplary embodiment has a hardware configuration and logical configuration similar to those of the first exemplary embodiment. A description thereof will thus be omitted. Differences between the present exemplary embodiment and the first exemplary embodiment will mainly be described below. In the following description, components similar to those of the first exemplary embodiment are designated by the same reference numerals.

<Processing Performed by Information Processing Apparatus 1>

The present exemplary embodiment differs from the first exemplary embodiment in the processing for determining the lighting effect list in step S402. The lighting effect list determination unit 302 according to the present exemplary embodiment sets the distance accuracy based on the distance image data and then updates the distance accuracy based on preset personal information. The personal information includes a personal name, personal image data, personal distance image data, and personal distance accuracy. FIG. 16 illustrates an example of the personal information. The personal image data is image data representing an image including at least a person's face. The face region of the corresponding person is set in the personal image data. The personal distance image data is distance image data corresponding to the personal image data. The personal distance accuracy indicates the accuracy of the distance information included in the personal distance image data. Like the foregoing distance accuracy, the personal distance accuracy is set to any one of "high", "intermediate", and "low". Pieces of personal information corresponding to a respective plurality of persons can be set in advance. Details of the processing for determining the lighting effect list will be described below.

<Processing for Determining Lighting Effect List (Step S402)>

Figure 17:
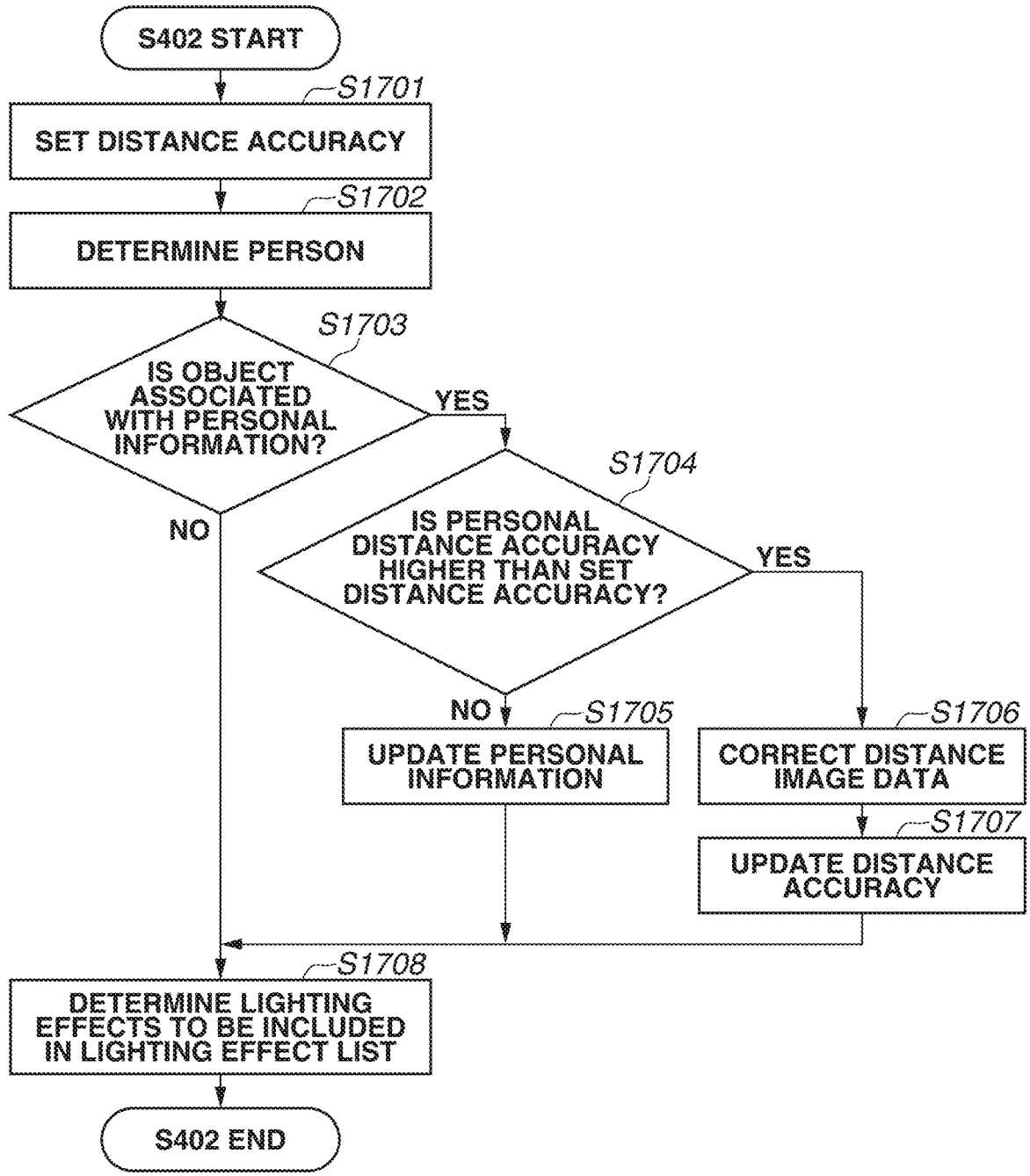
FIG. 17 is a flowchart illustrating processing for setting the lighting effect list.

FIG. 17 is a flowchart illustrating the processing for determining the lighting effect list. In step S1701, the lighting effect list determination unit 302 determines the distance accuracy based on the distance image data. The processing of step S1701 is similar to that of steps S501 to S506 according to the first exemplary embodiment. A description thereof will thus be omitted.

In step S1702, the lighting effect list determination unit 302 determines the person included in the color image. The lighting effect list determination unit 302 initially extracts a face region from the color image. The lighting effect list determination unit 302 calculates degrees of similarity between the person's face in the extracted face region with persons' faces indicated by the preset personal information, and selects personal information indicating the face of the highest degree of similarity. The degrees of similarity are calculated based on differences between the face region extracted from the color image and the face regions in the personal images represented by the personal image data. If the degree of similarity of the selected personal information is higher than or equal to a predetermined value, the lighting effect list determination unit 302 associates the object in the color image with the selected personal information. If the degree of similarity of the selected personal information is lower than the predetermined value, the lighting effect list determination unit 302 determines that there is no personal information corresponding to the object in the color image. The lighting effect list determination unit 302 also determines that there is no personal information corresponding to the object in the color image if no face region is extracted from the color image.

In step S1703, the lighting effect list determination unit 302 determines whether the object in the color image is associated with personal information. If the object in the color image is associated with personal information (YES in step S1703), the processing proceeds to step S1704. If the object in the color image is not associated with personal information (NO in step S1703), the processing proceeds to step S1708. In step S1704, the lighting effect list determination unit 302 compares the personal distance accuracy included in the personal information with the distance accuracy set in step S1701. If the personal distance accuracy is lower than or equal to the distance accuracy set in step S1701 (NO in step S1704), the processing proceeds to step S1705. If the personal distance accuracy is higher than the distance accuracy set in step S1701 (YES in step S1704), the processing proceeds to step S1706.

In step S1705, the lighting effect list determination unit 302 updates the personal image data, the personal distance image data, and the personal distance accuracy included in the personal information. The personal image data is updated based on the color image data. The color image is deformed to the personal image based on the face region, and the image data representing the deformed color image is assumed as new personal image data. The personal distance image data is updated based on the distance image data. The distance image is deformed in a manner similar to that for the color image, and the image data representing the deformed distance image is assumed as new personal distance image data. The personal distance accuracy is updated with the distance accuracy set in step S1701. The distance accuracy included in the personal information can be increased by updating the personal information as described above.

In step S1706, the lighting effect list determination unit 302 corrects the distance image data based on the personal distance image data. The lighting effect list determination unit 302 initially calculates parameters for deforming the personal image to the color image. The lighting effect list determination unit 302 deforms the personal distance image to the distance image based on the calculated parameters. The parameters to be calculated here are projective transformation parameters based on feature points extracted from the personal image and the color image. The image data representing the deformed personal distance image is assumed as new distance image data. In step S1707, the lighting effect list determination unit 302 updates the distance accuracy with the value of the personal distance accuracy. In step S1708, the lighting effect list determination unit 302 determines the lighting effects to be included in the lighting effect list based on the distance accuracy. The processing of step S1708 is similar to that of step S507 according to the first exemplary embodiment. A description thereof will thus be omitted.

<Effect of Fifth Exemplary Embodiment>

As described above, the information processing apparatus 1 according to the present exemplary embodiment sets the distance accuracy based on the preset personal information. The information processing apparatus 1 can thus determine appropriate candidates for the lighting effect to apply a lighting effect to the image based on the distance information about the object.

<Modifications>

In the present exemplary embodiment, the personal information is updated in step S1705. However, the processing of step S1705 may be omitted.

In the present exemplary embodiment, the personal distance image is deformed and the deformed personal distance image is assumed as a new distance image in step S1706. However, the deformed personal distance image and the distance image may be combined into a new distance image.

In step S1706, the distance values of the personal distance image may be corrected based on the distance values of the distance image before the deformation of the personal distance image. For example, the distance values of the personal distance image may be corrected so that an average distance value in the face region of the personal distance image and an average distance value in the face region of the distance image have a smaller difference or coincide with each other.

A sixth exemplary embodiment of the disclosure will be described below. In the present exemplary embodiment, an imaging method is set based on user operations. The lighting effect list is determined based on the set imaging method. An information processing apparatus 1 according to the present exemplary embodiment has a hardware configuration and logical configuration similar to those of the first exemplary embodiment. A description thereof will thus be omitted. Differences between the present exemplary embodiment and the first exemplary embodiment will mainly be described below. In the following description, components similar to those of the first exemplary embodiment are designated by the same reference numerals.

<Processing Performed by Information Processing Apparatus 1>

Figure 18:
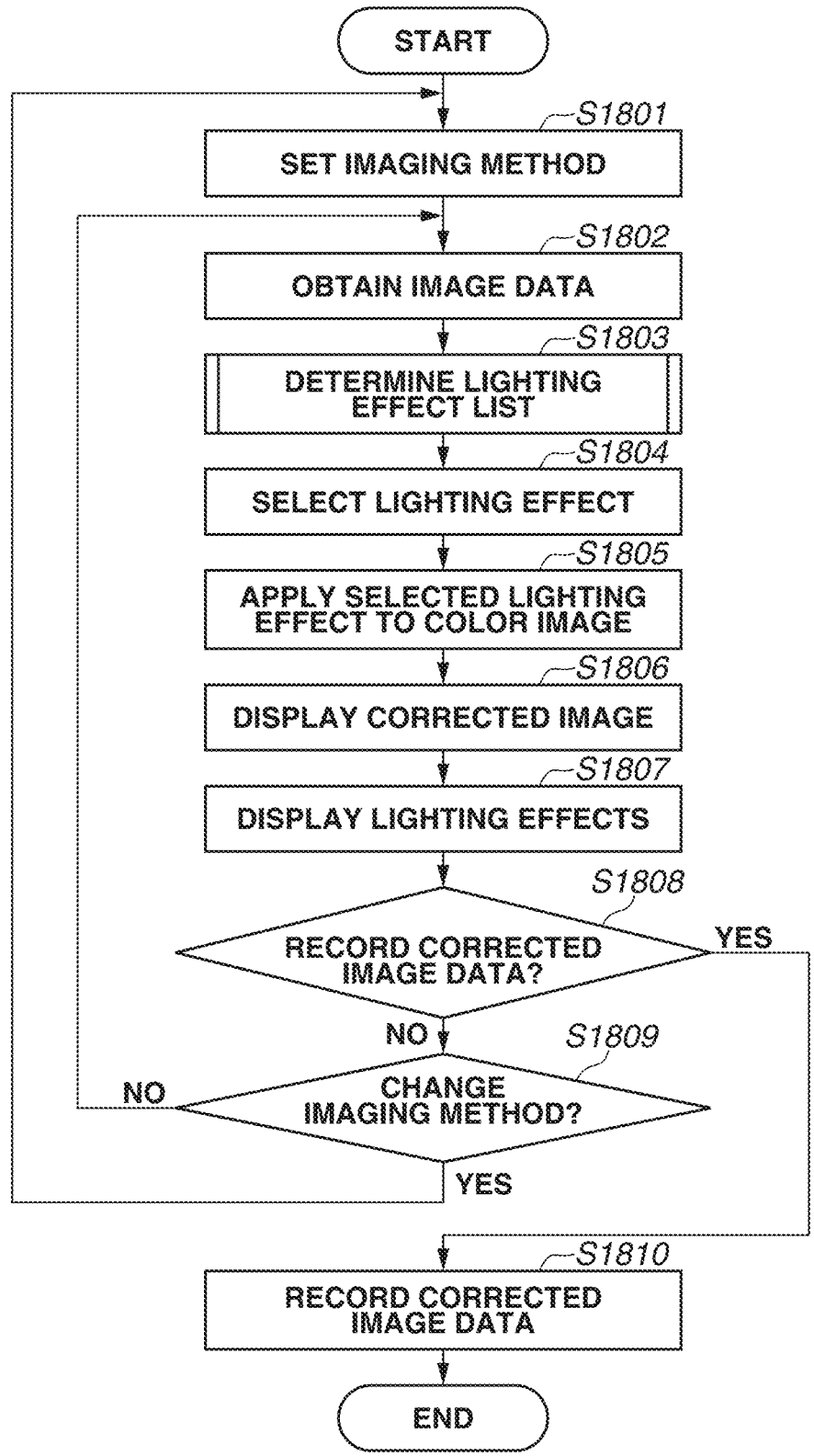
FIG. 18 is a flowchart illustrating processing which is performed by an information processing apparatus.

In the present exemplary embodiment, the distance accuracy is set based on the imaging method for capturing an image to obtain color image data. FIG. 18 is a flowchart illustrating the processing which is performed by the information processing apparatus 1 according to the present exemplary embodiment. In step S1801, the image data obtaining unit 301 sets the imaging method for obtaining image data based on user operations obtained from the input/output unit 309. In the present exemplary embodiment, the user selects which camera to use for imaging, the front camera 201 located on the display side of the information processing apparatus 1 or the main camera 202 located on the rear side of the information processing apparatus 1. In the present exemplary embodiment, the front camera 201 is a single-lens camera not capable of obtaining distance information. The main camera 202 is a camera that can obtain distance image data based on parallax information.

In step S1802, the image data obtaining unit 301 obtains image data from the set camera. In step S1803, the lighting effect list determination unit 302 sets the distance accuracy based on the imaging method. The lighting effect list determination unit 302 also determines a lighting effect list including effective lighting effects based on the distance accuracy. The distance accuracy can be set by using a similar method to that described in the second exemplary embodiment. For example, if the front camera 201 is set as the camera to be used for imaging, the distance accuracy is determined to be "low" because the front camera 201 is unable to obtain distance information. If the main camera 202 is set as the camera to be used for imaging, the distance accuracy is determined to be "intermediate" because the main camera 202 obtains distance image data based on a parallax.

In step S1804, the lighting effect selection unit 303 selects one of the lighting effects included in the lighting effect list based on user operations obtained from the input/output unit 309. After the selection of the lighting effect, the lighting effect selection unit 303 sets parameters, such as the position of the virtual light source based on user operations. If no lighting effect is selected by user operations, the lighting effect selection unit 303 selects a lighting effect previously determined to be an initial state. In step S1805, the lighting processing unit 304 applies the selected lighting effect to the color image. The processing for applying the lighting effect to the color image is similar to the processing of step S404 according to the first exemplary embodiment.

Figure 19A:
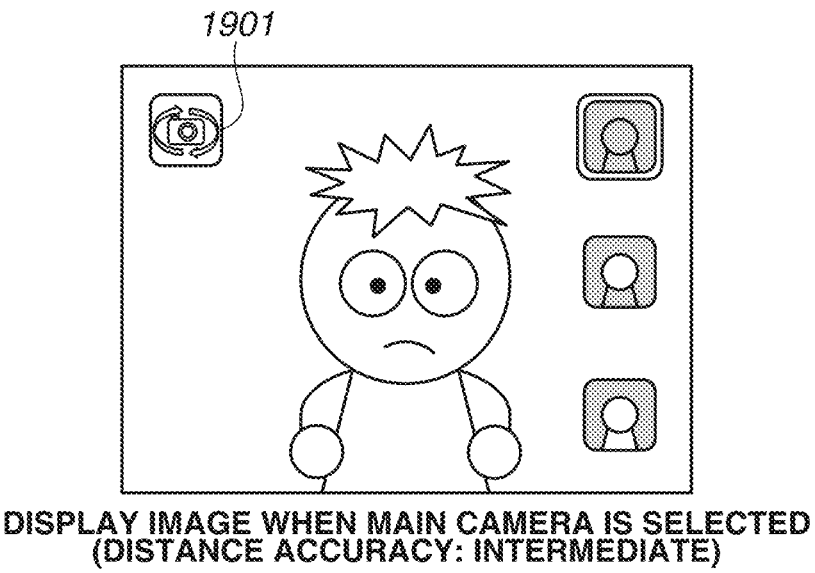
FIGS. 19A and 19B are diagrams illustrating examples of a display image when a lighting effect is applied to an image.
Figure 19B:
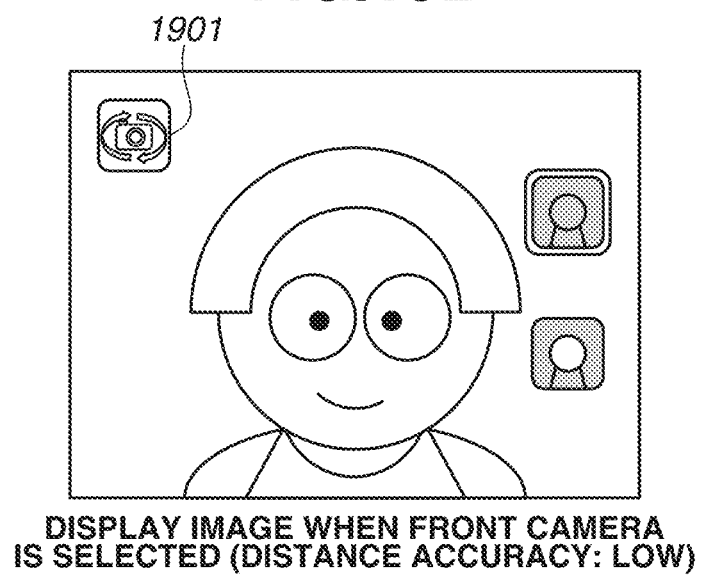

In step S1806, the image display control unit 305 displays the corrected image on the input/output unit 309. In step S1807, the lighting effect display control unit 306 displays the lighting effects included in the lighting effect list on the input/output unit 309. FIGS. 19A and 19B illustrate examples of a display image displayed by the image display control unit 305. FIG. 19A illustrates an example of the display image when the main camera 202 is selected as the camera to be used for imaging. In such a case, the icons corresponding to the distance accuracy "intermediate" are displayed. FIG. 19B illustrates an example of the display image when the front camera 201 is selected as the camera to be used for imaging. In such a case, the icons corresponding to the distance accuracy "low" are displayed. The user can change the imaging method by selecting an icon 1901 representing a camera switch operation.

In step S1808, the lighting processing unit 304 determines whether to record the corrected image data in the storage unit 307 based on user operations obtained from the input/output unit 309. If an operation to record the corrected image data is detected (YES in step S1808), the processing proceeds to step S1810. If no operation to record the corrected image data is detected (NO in step S1808), the processing proceeds to step S1809. In step S1809, the lighting processing unit 304 determines whether to change the imaging method based on user operations obtained from the input/output unit 309. If an operation to change the imaging method is detected (YES in step S1809), the processing proceeds to step S1801. If no operation to change the imaging method is detected (NO in step S1809), the processing proceeds to step S1802. In step S1810, the lighting processing unit 304 records the corrected image data in the storage unit 307. The processing ends.

<Effect of Sixth Exemplary Embodiment>

As described above, the information processing apparatus 1 according to the present exemplary embodiment sets the distance accuracy based on the imaging method for capturing an image to obtain color image data. The information processing apparatus 1 can thus determine appropriate candidates for the lighting effect to apply a lighting effect to the image based on the distance information about the object.

<Modifications>

In the present exemplary embodiment, the front camera 201 is a camera not capable of obtaining distance information, and the main camera 202 is a camera capable of obtaining distance image data based on parallax information. However, the combination of cameras is not limited thereto. The camera that projects light on the object to obtain distance information may be used as the front camera 201 or the main camera 202. Alternatively, three or more cameras may be switched.

Figure 29A:
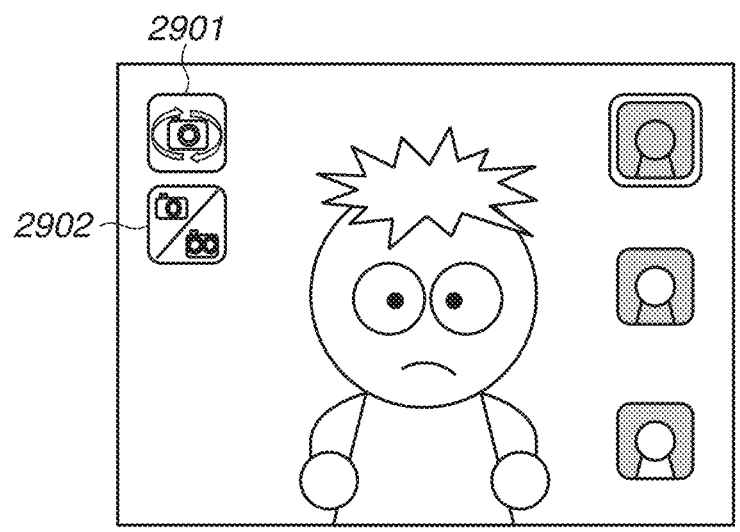
FIGS. 29A and 29B are diagrams illustrating examples of a display image when a lighting effect is applied to an image.
Figure 29B:
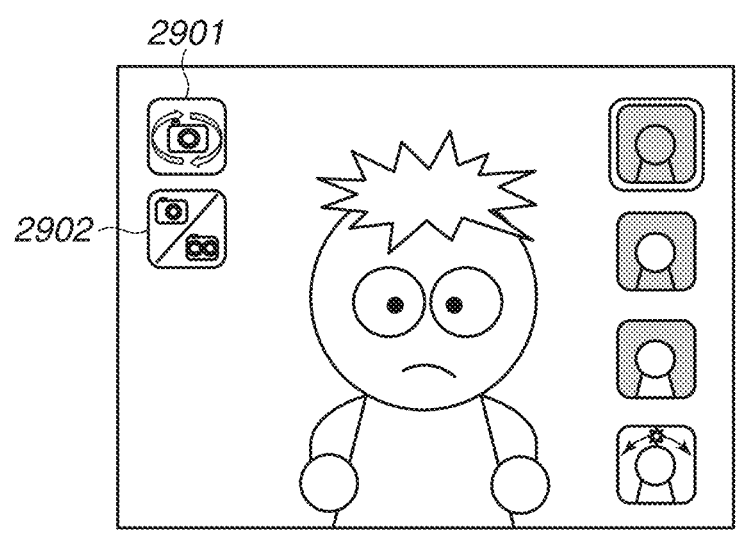

In the present exemplary embodiment, the lighting effect list is determined based on which camera the imaging method uses, the front camera 201 or the main camera 202. However, the lighting effect list may be determined based on an imaging mode during use of the main camera 202. In the present exemplary embodiment, the main camera 202 is one capable of obtaining distance image data based on parallax information, and includes a plurality of cameras. In the present exemplary embodiment, imaging modes available during use of the main camera 202 include a single-lens imaging mode in which one of the cameras can capture an image and obtain distance information, and a multi-lens imaging mode in which the plurality of cameras can capture an image and obtain distance information. In such a case, in step S1803, the lighting effect list determination unit 302 sets the distance accuracy based on the imaging mode. The lighting effect list determination unit 302 also determines the lighting effect list including effective lighting effects based on the distance accuracy. The distance accuracy can be set by using a similar method to that described with reference to FIG. 28 in the second exemplary embodiment. For example, if the imaging mode is the single-lens imaging mode, the distance accuracy is determined to be "intermediate" since distance information can be obtained but a plurality of cameras is not used for imaging. If the imaging mode is the multi-lens imaging mode, the distance accuracy is determined to be "high" since distance information can be obtained and a plurality of cameras is used for imaging. FIG. 29A illustrates an example of the display image when the single-lens imaging mode is selected as the imaging mode. In such a case, the icons corresponding to the distance accuracy "intermediate" are displayed. FIG. 29B illustrates an example of the display image when the multi-lens imaging mode is selected as the imaging mode. In such a case, the icons corresponding to the distance accuracy "high" are displayed. The user can change the imaging method by selecting an icon 2901 representing a camera switch operation. The user can change the imaging mode by selecting an icon 2902 representing an imaging mode switch operation. In the present exemplary embodiment, the front camera 201 is described to be a single-lens camera not capable of obtaining distance information. However, like the main camera 202, the front camera 201 may be configured as a camera that can obtain distance image data based on parallax information and can switch imaging modes. The imaging modes may include one in which a single camera is used for imaging and obtains no distance information.

A seventh exemplary embodiment of the disclosure will be described below. In the foregoing exemplary embodiments, the lighting effects are applied to a color image based on the lighting effect selected based on user operations. In the present exemplary embodiment, parameters to be used in the processing for applying a lighting effect to a color image (hereinafter, referred to as lighting parameters) are set based on user operations. An information processing apparatus 1 according to the present exemplary embodiment has a hardware configuration similar to that of the first exemplary embodiment. A description thereof will thus be omitted. Differences between the present exemplary embodiment and the first exemplary embodiment will mainly be described below. In the following description, components similar to those of the first exemplary embodiment are designated by the same reference numerals.

<Logical Configuration of Information Processing Apparatus 1>

Figure 20:
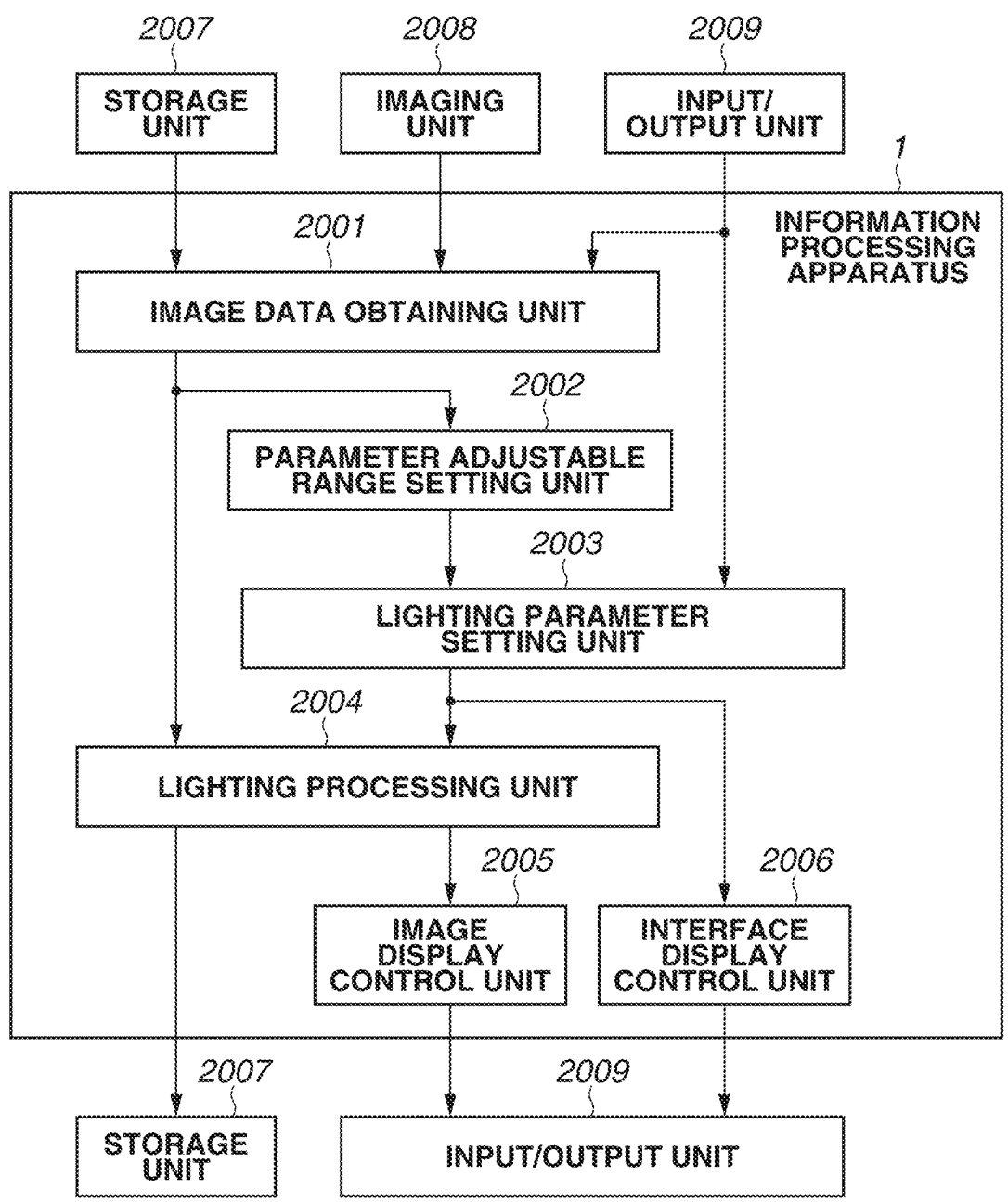
FIG. 20 is a diagram illustrating a logical configuration of an information processing apparatus.

FIG. 20 is a block diagram illustrating a logical configuration of the information processing apparatus 1 according to the present exemplary embodiment. The information processing apparatus 1 functions as the logical configuration illustrated in FIG. 20 by the CPU 101 executing programs stored in the ROM 102 with the RAM 103 as a work memory. All the processing described below does not necessarily need to be executed by the CPU 101. The information processing apparatus 1 may be configured so that part or all of the processing is performed by one or a plurality of processing circuits other than the CPU 101.

The information processing apparatus 1 includes an image data obtaining unit 2001, a parameter adjustable range setting unit 2002, a lighting parameter setting unit 2003, a lighting processing unit 2004, an image display control unit 2005, and an interface display control unit 2006. The image data obtaining unit 2001 obtains color image data and distance image data from an imaging unit 2008 or a storage unit 2007 based on user operations obtained from an input/output unit 2009. For example, the functions of the storage unit 2007 are implemented by the storage device 110. The functions of the imaging unit 2008 are implemented by the imaging unit 106. The functions of the input/output unit 2009 are implemented by the touch panel display 105. The parameter adjustable range setting unit 2002 sets adjustable lighting parameters based on distance accuracy determined based on image data.

The lighting parameter setting unit 2003 sets the lighting parameters based on user operations obtained from the input/output unit 2009. The lighting processing unit 2004 applies a lighting effect to a color image based on the set lighting parameters. The lighting processing unit 2004 also records the corrected image data in the storage unit 2007 based on user operations obtained from the input/output unit 2009.

The image display control unit 2005 displays the corrected image on the input/output unit 2009. The interface display control unit 2006 displays an interface including sliders and a button for adjusting the lighting parameters on the input/output unit 2009.

<Processing Performed by Information Processing Apparatus 1>

Figure 21:
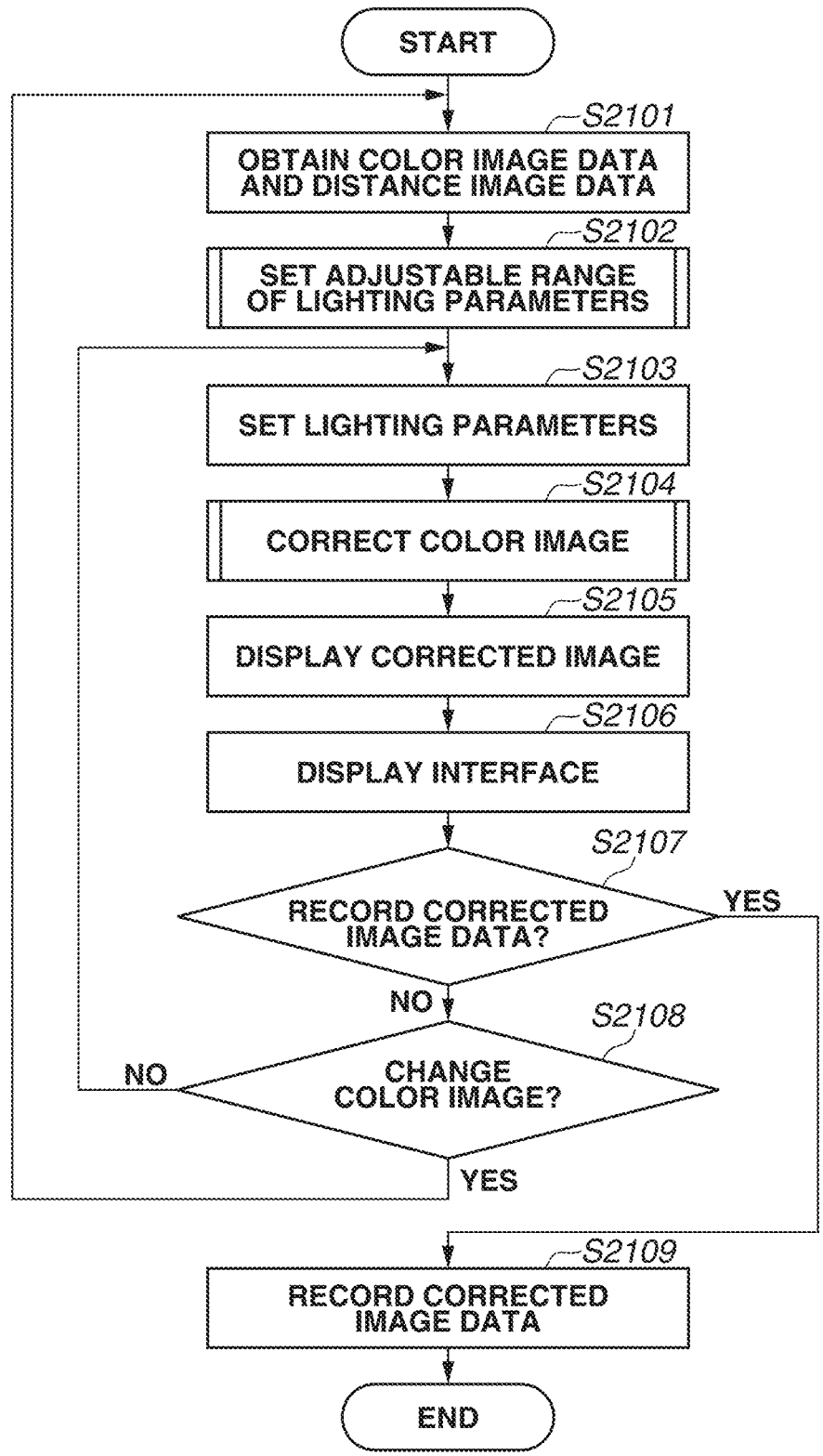
FIG. 21 is a flowchart illustrating processing which is performed by the information processing apparatus.

In the present exemplary embodiment, the adjustable range of lighting parameters is set based on the distance image data. In addition, the lighting effect is applied to the color image based on the lighting parameters set based on user operations. FIG. 21 is a flowchart illustrating processing which is performed by the information processing apparatus 1 according to the present exemplary embodiment.

In step S2101, the image data obtaining unit 2001 obtains color image data and distance image data from the storage unit 2007 based on user operations obtained from the input/output unit 2009. In step S2102, the parameter adjustable range setting unit 2002 sets the distance accuracy based on the distance image data. The parameter adjustable range setting unit 2002 also sets the adjustable range of lighting parameters based on the set distance accuracy. Details of the processing for setting the adjustable range of lighting parameters will be described below.

In step S2103, the lighting parameter setting unit 2003 sets the lighting parameters based on user operations obtained from the input/output unit 2009. If no user operation is made, the lighting parameter setting unit 2003 sets predetermined values as the lighting parameters. In step S2104, the lighting processing unit 2004 corrects the color image based on the set lighting parameters. Details of the processing for correcting the color image will be described below.

In step S2105, the image display control unit 2005 displays the corrected image on the input/output unit 2009. In step S2106, the interface display control unit 2006 displays the interface including sliders and a button for adjusting the lighting parameters on the input/output unit 2009. The display of the interface will be described in detail below. In step S2107, the lighting processing unit 2004 determines whether to record the corrected image data in the storage unit 2007 based on user operations obtained from the input/output unit 2009. If an operation to record the corrected image data is detected (YES in step S2107), the processing proceeds to step S2109. If no operation to record the corrected image data is detected (NO in step S2107), the processing proceeds to step S2108.

In step S2108, the lighting processing unit 2004 determines whether to change the color image to which the lighting effect is applied based on user operations obtained from the input/output unit 2009. If an operation to change the color image is detected (YES in step S2108), the processing proceeds to step S2101. If no operation to change the color image is detected (NO in step S2108), the processing proceeds to step S2103. In step S2109, the lighting processing unit 2004 records the corrected image data in the storage unit 2007. The processing ends.

<Processing for Setting Adjustable Range of Lighting Parameters (Step S2102)>

Figure 22:
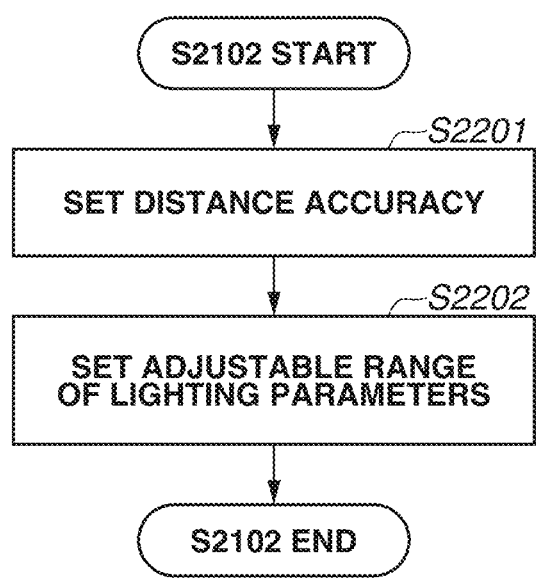
FIG. 22 is a flowchart illustrating processing for setting an adjustable range of lighting parameters.

FIG. 22 is a flowchart illustrating the processing for setting the adjustable range of lighting parameters. In step S2201, the parameter adjustable range setting unit 2002 sets the distance accuracy based on the distance image data. The processing of step S2201 is similar to that of steps S501 to S506 according to the first exemplary embodiment. A description thereof will thus be omitted.

In step S2202, the parameter adjustable range setting unit 2002 sets the adjustable range of lighting parameters based on the distance accuracy. FIG. 23A illustrates an example of a method for setting the adjustable range of lighting parameters based on the distance accuracy. In the present exemplary embodiment, the lighting parameters include parameters corresponding to ON/OFF, the brightness of the virtual light source, and the position of the virtual light source. The parameter ON/OFF indicates whether to apply the lighting effect. The parameter adjustable range setting unit 2002 sets user adjustability of the lighting parameters based on the distance accuracy. Specifically, the higher the distance accuracy, the more parameters are made adjustable by the user. For example, if the distance accuracy is "low", only ON/OFF is made adjustable. If the distance accuracy is "intermediate", ON/OFF and the brightness of the virtual light source are made adjustable. If the distance accuracy is "high", ON/OFF, the brightness of the virtual light source, and the position of the virtual light source are made adjustable.

<Processing for Correcting Color Image (Step S2104)>

Figure 24:
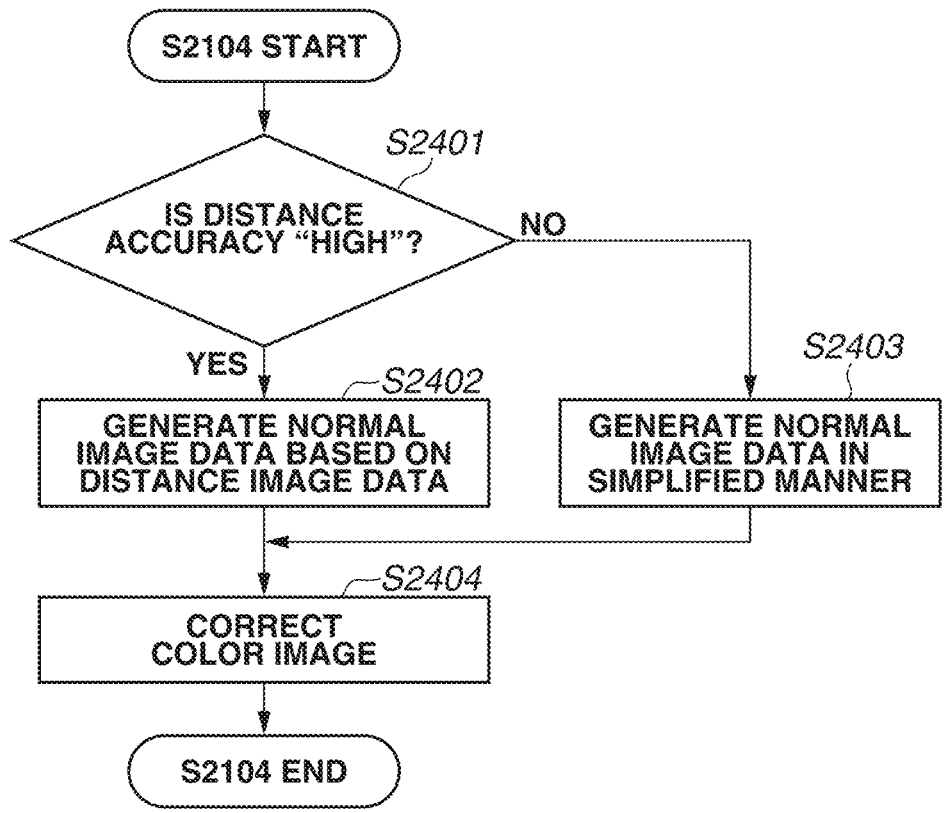
FIG. 24 is a flowchart illustrating processing for applying a lighting effect to an image.

FIG. 24 is a flowchart illustrating the processing for correcting the color image. In step S2401, the lighting processing unit 2004 determines the distance accuracy set in step S2102. If the distance accuracy is "high" (YES in step S2401), the processing proceeds to step S2402. If the distance accuracy is "intermediate" or "low" (NO in step S2401), the processing proceeds to step S2403. In step S2402, the lighting processing unit 2004 generates normal image data based on the distance image data. The processing of step S2402 is similar to that of step S803 according to the first exemplary embodiment. A description thereof will thus be omitted.

In step S2403, the lighting processing unit 2004 generates normal image data in a simplified manner. The processing of step S2403 is similar to that of step S804 according to the first exemplary embodiment. A description thereof will thus be omitted. In step S2404, the lighting processing unit 2004 corrects the color image based on the lighting parameter(s) set in step S2103. The lighting processing unit 2004 add shades based on the distance image data and the normal image data to the color image according to Eq. (7):

$$I''=I+w\alpha D(d)H(n,L)I, \quad \text{Eq. (7)}$$

where I is a pixel value of the color image, and I" is a pixel value of the shaded color image.

w is a parameter corresponding to whether the lighting effect is ON or OFF. If the lighting effect is ON, w=1. If the lighting effect is OFF, w=0. α is a parameter corresponding to the brightness of the virtual light source. The value of a is set based on user operations. L is a parameter corresponding to the light source vector indicating the direction from the object to the virtual light source. The value of L is set based on user operations related to the position of the virtual light source. D(d), H(n, L), and n are similar to those in the first exemplary embodiment.

<Display Interface (Step S2106)>

Figure 25B:
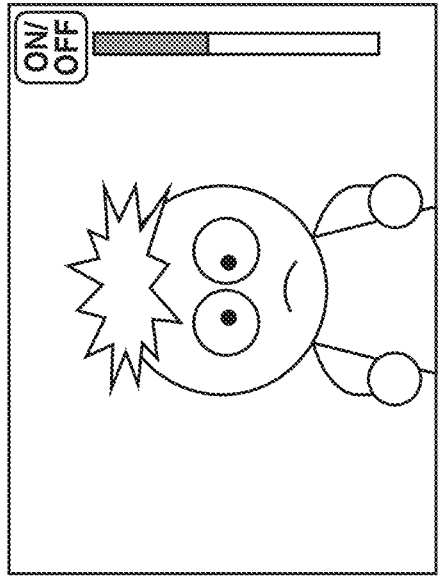
FIGS. 25A, 25B, 25C, and 25D are diagrams illustrating examples of a display image when a lighting effect is applied to an image.
Figure 25D:
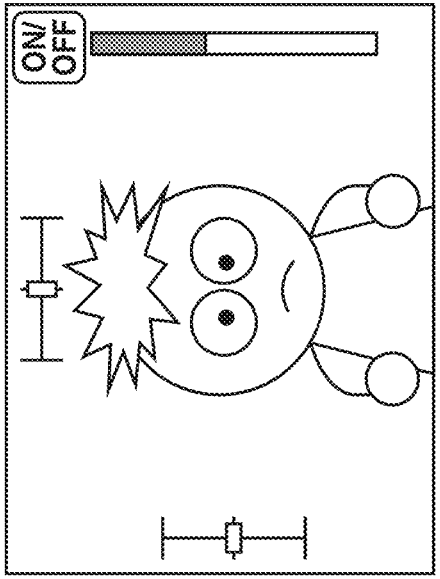
Figure 25A:
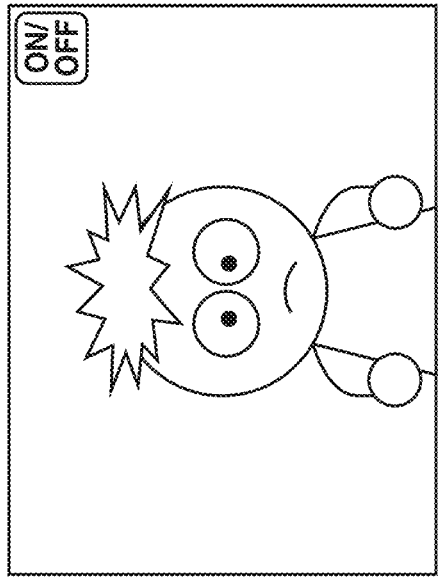
Figure 25C:
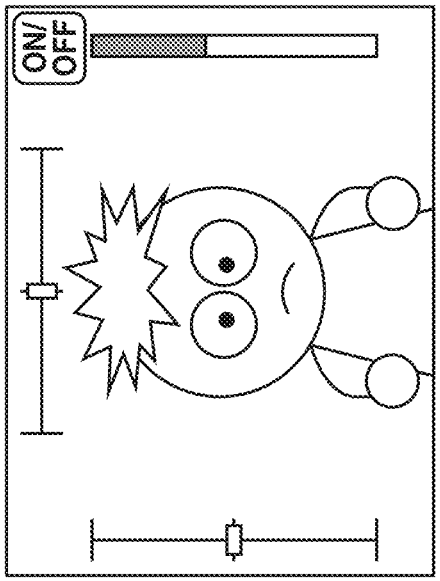

Now, the display of the interface in step S2106 will be described. FIGS. 25A, 25B, 25C, and 25D illustrate display examples of the interface. In the present exemplary embodiment, the interface display control unit 2006 displays sliders and a button for adjusting the lighting parameters on the corrected image in a superimposed manner. If the distance accuracy is "low", the interface display control unit 2006 displays a button for switching ON/OFF of the lighting effect as illustrated in FIG. 25A. If the distance accuracy is "intermediate", the interface display control unit 2006 displays the button for ON/OFF switching and a slider for adjusting the brightness of the virtual light source as illustrated in FIG. 25B. If the distance accuracy is "high", the interface display control unit 2006 display the button for ON/OFF switching, the slider for adjusting brightness, and sliders for adjusting the position of the virtual light source as illustrated in FIG. 25C. The lighting parameters can be adjusted by user operations on the interface displayed on the input/output unit 2009.

<Effect of Seventh Exemplary Embodiment>

As described above, the information processing apparatus 1 according to the present exemplary embodiment sets the adjustable range of lighting parameters based on the distance accuracy. By thus limiting the adjustable range of lighting parameters based on the distance accuracy, the information processing apparatus 1 can determine appropriate candidates for the lighting effect to apply a lighting effect to the image based on the distance information about the object.

<Modifications>

In the present exemplary embodiment, the number of adjustable lighting parameters is changed based on the distance accuracy. However, the adjustable ranges of the respective lighting parameters may be changed based on the distance accuracy. For example, the adjustable range of the position of the virtual light source may be switched based on the distance accuracy. FIG. 23B illustrates an example of the method for setting the adjustable ranges of the lighting parameters based on the distance accuracy. FIG. 25D illustrates an example of the display image when the distance accuracy is "intermediate". In this example, where the distance accuracy is "intermediate", the position of the virtual light source is set to be adjustable within a narrower range. In the display image illustrated in FIG. 25D where the distance accuracy is "intermediate", the ranges of movement of the sliders for adjusting the position of the virtual light source are narrower than in the display image illustrated in FIG. 25C where the distance accuracy is "high".

In the present exemplary embodiment, the distance accuracy is determined based on the distance image data. However, the distance accuracy may be determined by using other methods described in the foregoing exemplary embodiments.

An eighth exemplary embodiment of the disclosure will be described below. In the seventh exemplary embodiment, the adjustable range of lighting parameters is set based on the distance accuracy. In the present exemplary embodiment, the adjustable range of lighting parameters is set based on the imaging method. An information processing apparatus 1 according to the present exemplary embodiment has a hardware configuration and logical configuration similar to those of the seventh exemplary embodiment. A description thereof will thus be omitted. Differences between the present exemplary embodiment and the seventh exemplary embodiment will mainly be described below. In the following description, components similar to those of the seventh exemplary embodiment are designated by the same reference numerals.

<Processing Performed by Information Processing Apparatus 1>

Figure 26:
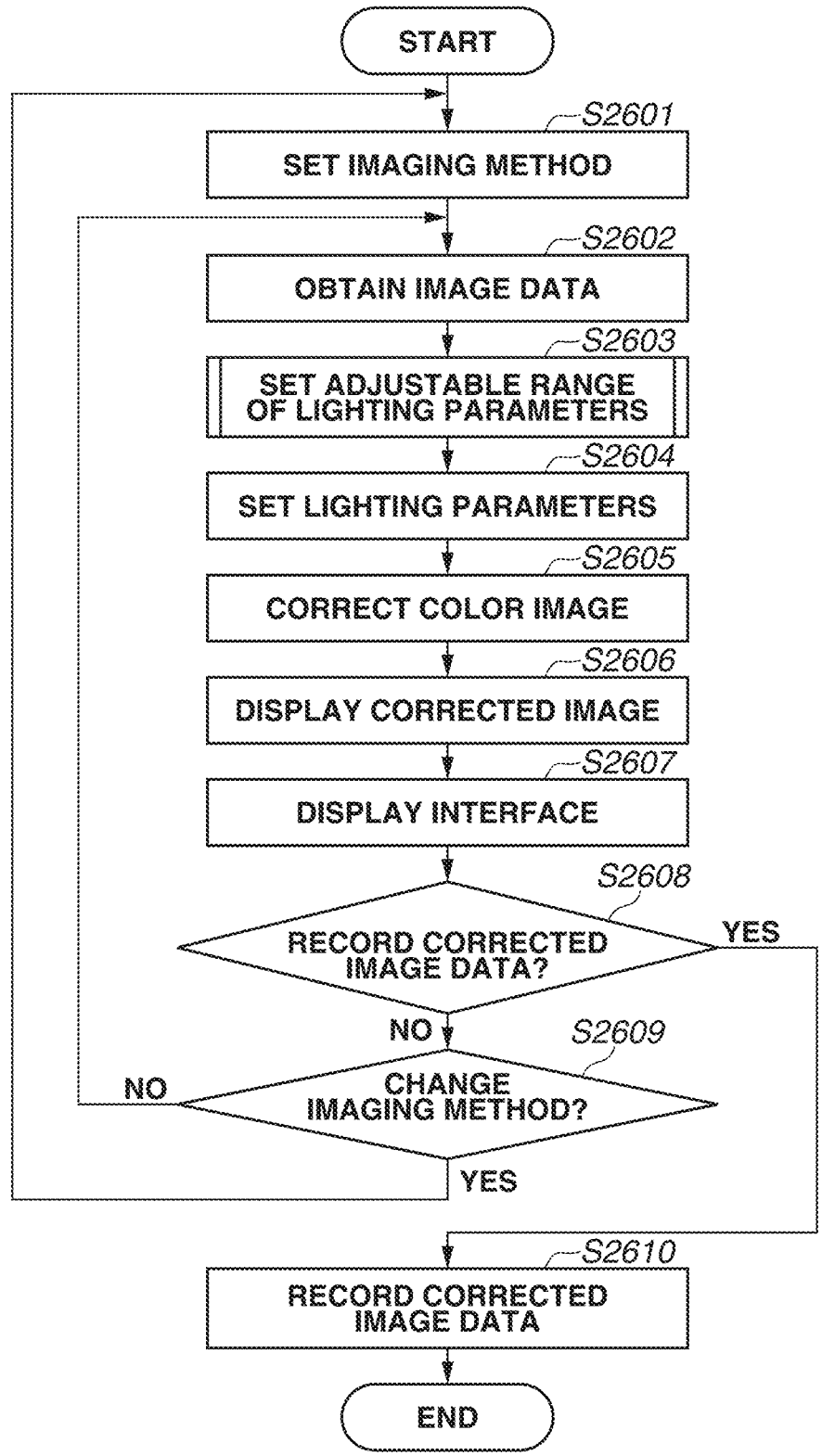
FIG. 26 is a flowchart illustrating processing which is performed by an information processing apparatus.

FIG. 26 is a flowchart illustrating processing which is performed by the information processing apparatus 1 according to the present exemplary embodiment. In step S2601, the image data obtaining unit 2001 sets the imaging method for obtaining image data based on user operations obtained from the input/output unit 2009. In the present exemplary embodiment, the user selects which camera to use for imaging, the front camera 201 located on the display side of the information processing apparatus 1 or the main camera 202 located on the rear side of the information processing apparatus 1. In the present exemplary embodiment, the front camera 201 is a single-lens camera not capable of obtaining distance information. The main camera 202 is a camera that can obtain distance image data based on parallax information.

In step S2602, the image data obtaining unit 2001 obtains image data from the set camera. In step S2603, the parameter adjustable range setting unit 2002 sets the distance accuracy based on the imaging method, and sets the adjustable range of lighting parameters based on the set distance accuracy. The method for setting the distance accuracy based on the imaging method is similar to that of the sixth exemplary embodiment. A description thereof will thus be omitted. The method for setting the adjustable range of lighting parameters is similar to that of the seventh exemplary embodiment. A description thereof will thus be omitted. In step S2604, the lighting parameter setting unit 2003 sets the lighting parameters based on user operations obtained from the input/output unit 2009. If no user operation is made, the lighting parameter setting unit 2003 sets predetermined values as the lighting parameters.

In step S2605, the lighting processing unit 2004 corrects the color image based on the set lighting parameters. The processing for correcting the color image is similar to that of the seventh exemplary embodiment. A description thereof will thus be omitted. In step S2606, the image display control unit 2005 displays the corrected image on the input/output unit 2009.

Figure 27A:
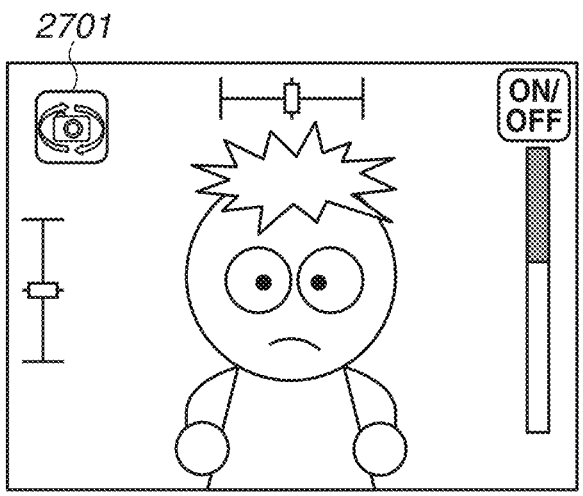
FIGS. 27A and 27B are diagrams illustrating examples of a display image when a lighting effect is applied to an image.
Figure 27B:
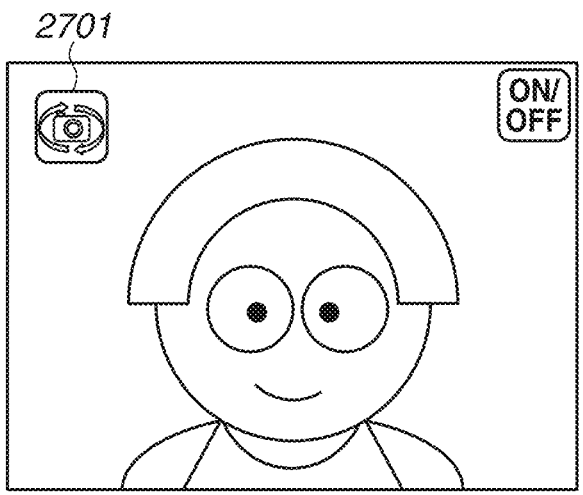

In step S2607, the interface display control unit 2006 displays an interface for adjusting the lighting parameters. FIGS. 27A and 27B illustrate examples of the display image.

FIG. 27A illustrates an example of the display image when the main camera 202 is selected as the camera to be used for imaging. In such a case, the interface display control unit 2006 displays an interface corresponding to the distance accuracy "intermediate". FIG. 27B illustrates an example of the display image when the front camera 201 is selected as the camera to be used for imaging. In such a case, the interface display control unit 2006 displays an interface corresponding to the distance accuracy "low". The user changes the imaging method by selecting an icon 2701 representing a camera switch operation.

In step S2608, the lighting processing unit 2004 determines whether to record the corrected image data in the storage unit 2007 based on user operations obtained from the input/output unit 2009. If an operation to record the corrected image data is detected (YES in step S2608), the processing proceeds to step S2610. If no operation to record the corrected image data is detected (NO in step S2608), the processing proceeds to step S2609. In step S2609, the lighting processing unit 2004 determines whether to change the imaging method based on user operations obtained from the input/output unit 2009. If an operation to change the imaging method is detected (YES in step S2609), the processing proceeds to step S2601. If no operation to change the imaging method is detected (NO in step S2609), the processing proceeds to step S2602. In step S2610, the lighting processing unit 2004 records the corrected image data in the storage unit 2007. The processing ends.

<Effect of Eighth Exemplary Embodiment>

As described above, the information processing apparatus 1 according to the present exemplary embodiment sets the adjustable range of lighting parameters based on the imaging method for capturing an image to obtain color image data. By thus limiting the adjustable range of lighting parameters based on the imaging method, the information processing apparatus 1 can determine appropriate candidates for the lighting effect to apply a lighting effect to the image based on the distance information about the object.

<Modifications>

In the present exemplary embodiment, the front camera 201 is a camera not capable of obtaining distance information, and the main camera 202 is a camera that obtains distance image data based on parallax information. However, the combination of cameras is not limited thereto. A camera that projects light on the object to obtain distance information may be used as the front camera 201 or the main camera 202. Alternatively, three or more cameras may be switched.

Other Exemplary Embodiments

In the foregoing exemplary embodiments except the second exemplary embodiment, the information processing apparatus 1 has the hardware configuration illustrated in FIG. 1A. However, the hardware configuration of the information processing apparatus 1 is not limited to the foregoing examples. For example, the information processing apparatus 1 may have the hardware configuration illustrated in FIG. 1B. The information processing apparatus 1 includes a CPU 101, a ROM 102, a RAM 103, a video card (VC) 111, a general-purpose I/F 114, and a Serial Advanced Technology Attachment (Serial ATA, or SATA) I/F 118. The CPU 101 executes an OS and various programs stored in the ROM 102 and a storage device 110 by using the RAM 103 as a work memory. The CPU 101 controls the components via a system bus 108. An input device 116, such as a mouse and a keyboard, and an imaging device 117 are connected to the general-purpose I/F 114 via a serial bus 115. The storage device 110 is connected to the SATA I/F 118 via a serial bus 119. A display 113 is connected to the VC 111 via a serial bus 112. The CPU 101 displays a user interface (UI) provided by a program on the display 113, and receives input information indicating user instructions obtained via the input device 116. For example, the information processing apparatus 1 illustrated in FIG. 1B is implemented by a desktop PC. The information processing apparatus 1 can also be implemented by a digital camera integrated with the imaging device 117, or a PC integrated with the display 113.

In the foregoing exemplary embodiments except the second exemplary embodiment, the information processing apparatus 1 includes two cameras, or the main camera 202 and the front camera 201, as the imaging unit 106. However, the imaging unit 106 is not limited to the foregoing examples. For example, the information processing apparatus 1 may include only the main camera 202.

In the foregoing exemplary embodiments, the target image to which a lighting effect is to be applied is a color image. However, the target image may be a grayscale image.

While the storage device 110 in the foregoing exemplary embodiments is an HDD, the storage device 110 is not limited to the foregoing examples. For example, the storage device 110 may be a solid state drive (SSD). The storage device 110 can also be implemented by a medium (storage medium) and an external storage drive for accessing the medium. Examples of the medium may include a flexible disk (FD), a compact disk read-only memory (CD-ROM), a digital versatile disc (DVD), a Universal Serial Bus (USB) memory, a magneto-optical (MO) disc, and a flash memory.

According to an exemplary embodiment of the disclosure, appropriate candidates for a lighting effect can be determined to apply a lighting effect to an image based on distance information about an object.

Other Embodiments

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2019-020147, filed Feb. 6, 2019, and No. 2019-184741, filed Oct. 7, 2019, which are hereby incorporated by reference herein in their entirety.

What is claimed is:

1. An information processing apparatus comprising:
a processor; and
a memory containing instructions that, when executed by the processor, cause the processor to perform as:
a first obtaining unit configured to obtain image data representing an image of an object using an imaging device,
a second obtaining unit configured to obtain distance information corresponding to the image data and representing distance between the imaging device and the object, and
a first determination unit configured to determine, based on accuracy of the distance information, a candidate for a lighting effect applicable to the image in applying a lighting effect based on the distance information to the image,
wherein the processor further performs as a second determination unit configured to determine the accuracy of the distance information,
wherein the first determination unit is configured to determine the candidate for the lighting effect applicable to the image based on a determination result of the second determination unit,
wherein the second determination unit is configured to determine the accuracy of the distance information about a region corresponding to the object in the image, and
wherein the second determination unit is configured to determine the accuracy of the distance information based on whether a projection and a depression in a face of the object are identifiable from the image.

2. The information processing apparatus according to claim 1, wherein the second determination unit is configured to determine the accuracy of the distance information by comparing the distance information with a predetermined value.

3. The information processing apparatus according to claim 1, wherein the second determination unit is configured to determine the accuracy of the distance information based on information about the imaging device which is used to obtain the distance information.

4. The information processing apparatus according to claim 3, wherein the second determination unit is configured to determine the accuracy of the distance information based on whether the imaging device configured to obtain the distance information has a function of obtaining distance information.

5. The information processing apparatus according to claim 4, wherein the function is a function of obtaining the distance information by projecting light on the object.

6. The information processing apparatus according to claim 1, wherein the second determination unit is configured to determine the accuracy of the distance information based on a focus position in capturing an image to obtain the image data.

7. The information processing apparatus according to claim 1, wherein the processor further perform as a control unit configured to control a presentation unit that presents the candidate for the lighting effect applicable to the image,
wherein the control unit is configured to display an icon representing the candidate for the lighting effect applicable to the image on a display unit.

8. The information processing apparatus according to claim 7, wherein the control unit is configured to display the icon on the display unit, the icon being superimposed on the image to which the lighting effect has been applied.

9. The information processing apparatus according to claim 1, wherein the processor further perform as a control unit configured to control a presentation unit that presents the candidate for the lighting effect applicable to the image,
wherein the control unit is configured to present the candidate for the lighting effect applicable to the image by displaying an adjustable range of the lighting effect on a display unit.

10. An information processing apparatus comprising:
a processor; and
a memory containing instructions that, when executed by the processor, cause the processor to perform as:
a first obtaining unit configured to obtain image data representing an image of an object using an imaging device,
a second obtaining unit configured to obtain distance information corresponding to the image data and representing distance between the imaging device and the object, and
a first determination unit configured to determine, based on accuracy of the distance information, a candidate for a lighting effect applicable to the image in applying a lighting effect based on the distance information to the image,
wherein the processor further performs as a second determination unit configured to determine the accuracy of the distance information,
wherein the first determination unit is configured to determine the candidate for the lighting effect applicable to the image based on a determination result of the second determination unit,
wherein the second determination unit is configured to determine the accuracy of the distance information based on a scene captured to obtain the image data, and
wherein the second determination unit is configured to determine the accuracy of the distance information based on whether the scene includes a person.

11. The information processing apparatus according to claim 10, wherein the second determination unit is configured to determine the accuracy of the distance information based on whether the scene includes a temporary state of a moving object.

12. An information processing apparatus comprising:
a processor; and
a memory containing instructions that, when executed by the processor, cause the processor to perform as:
a first obtaining unit configured to obtain image data representing an image of an object using an imaging device,
a second obtaining unit configured to obtain distance information corresponding to the image data and representing distance between the imaging device and the object, and
a first determination unit configured to determine, based on accuracy of the distance information, a candidate for a lighting effect applicable to the image in applying a lighting effect based on the distance information to the image, wherein the processor further performs as a second determination unit configured to determine the accuracy of the distance information, wherein the first determination unit is configured to determine the candidate for the lighting effect applicable to the image based on a determination result of the second determination unit, and wherein the second determination unit is configured to determine the accuracy of the distance information based on information corresponding to a person included in the image.

13. The information processing apparatus according to claim 12, wherein the processor further perform as a third obtaining unit configured to obtain personal information identifying a person, wherein the second determination unit is configured to extract a region corresponding to a person's face from the image, and determine the accuracy of the distance information based on a degree of similarity between the face in the extracted region and a face of a person identified by the personal information.

14. An information processing method comprising:

obtaining image data representing an image of an object using an imaging device;

obtaining distance information corresponding to the image data and representing distance between the first imaging unit and the object;

determining, based on accuracy of the distance information, a candidate for a lighting effect applicable to the image in applying the lighting effect based on the distance information to the image; and determining the accuracy of the distance information, wherein determining the candidate determines the candidate for the lighting effect applicable to the image based on a determination result of the determining of the accuracy of the distance information, wherein determining the accuracy of the distance information determines the accuracy of the distance information about a region corresponding to the object in the image, and wherein determining the accuracy of the distance information determines the accuracy of the distance information based on whether a projection and a depression in a face of the object are identifiable from the image.

15. A non-transitory computer-readable storage medium storing instructions that, when executed by a computer, cause the computer to perform a method comprising:

obtaining image data representing an image of an object using an imaging device;

obtaining distance information corresponding to the image data and representing distance between the first imaging unit and the object;

determining, based on accuracy of the distance information, a candidate for a lighting effect applicable to the image in applying the lighting effect based on the distance information to the image, and determining the accuracy of the distance information, wherein determining the candidate determines the candidate for the lighting effect applicable to the image based on a determination result of the determining of the accuracy of the distance information, wherein determining the accuracy of the distance information determines the accuracy of the distance information about a region corresponding to the object in the image, and wherein determining the accuracy of the distance information determines the accuracy of the distance information based on whether a projection and a depression in a face of the object are identifiable from the image.

* * * * *